(12) United States Patent
Shirakata et al.

(10) Patent No.: US 7,545,870 B1
(45) Date of Patent: Jun. 9, 2009

(54) RECEPTION DEVICE

(75) Inventors: Naganori Shirakata, Osaka (JP); Yukihiro Omoto, Osaka (JP); Yoshio Urabe, Nara (JP); Yasuo Harada, Berkshire (GB)

(73) Assignee: Panasonic Corporation, Osaka (JP)

( * ) Notice: Subject to any disclaimer, the term of this patent is extended or adjusted under 35 U.S.C. 154(b) by 587 days.

(21) Appl. No.: 10/582,765

(22) PCT Filed: Apr. 12, 2005

(86) PCT No.: PCT/JP2005/007102

§ 371 (c)(1),
(2), (4) Date: Jun. 28, 2006

(87) PCT Pub. No.: WO2005/101721

PCT Pub. Date: Oct. 27, 2005

(30) Foreign Application Priority Data

Apr. 14, 2004 (JP) ............................ 2004-118592

(51) Int. Cl.
*H04L 7/00* (2006.01)
*H04L 27/28* (2006.01)

(52) U.S. Cl. .................. 375/260; 375/344; 375/355
(58) Field of Classification Search .............. 375/259, 375/260, 267, 344, 354, 355
See application file for complete search history.

(56) References Cited

U.S. PATENT DOCUMENTS 6,373,861 B1 * 4/2002 Lee .............................. 370/503
7,058,151 B1 * 6/2006 Kim ............................. 375/355
7,088,782 B2 * 8/2006 Mody et al. .................. 375/260
2004/0247044 A1 12/2004 Matsushita et al.

FOREIGN PATENT DOCUMENTS

| EP | 1 063 824 | 12/2000 |
|---|---|---|
| GB | 2 368 250 | 4/2002 |
| JP | 10-308715 | 11/1998 |
| JP | 2000-068972 | 3/2000 |
| JP | 2000-228656 | 8/2000 |
| JP | 2001-069119 | 3/2001 |
| JP | 2002-026858 | 1/2002 |
| JP | 2003-115812 | 4/2003 |

\* cited by examiner

*Primary Examiner*—David B Lugo
(74) *Attorney, Agent, or Firm*—Wenderoth, Lind & Ponack, L.L.P.

(57) ABSTRACT

A reception device according to the present invention receives a transmission frame including a synchronization symbol string, having a synchronization symbol repeated multiple times, inserted before a data symbol string. The synchronization symbol is obtained by synthesizing a plurality of sub band symbols which are mutually orthogonal and having different carrier frequencies. The carrier frequencies of the sub band symbols are located at an equal predetermined frequency interval. The synchronization symbol includes a repeated synchronization pattern. The reception device detects a rough carrier frequency error from a phase difference of a synchronization pattern correlation value to correct the frequency, and then detects a residual frequency error from an inter-symbol phase difference of each sub band to correct the frequency. The reception device detects a sampling clock frequency error from an inter-sub band phase difference to correct the frequency. Thus, the demodulation error of the data symbol is reduced.

9 Claims, 11 Drawing Sheets

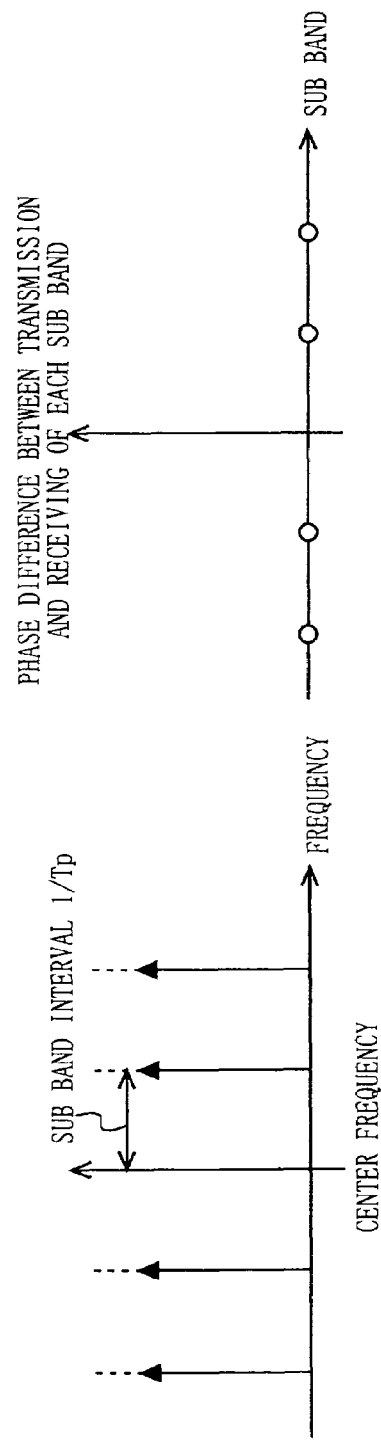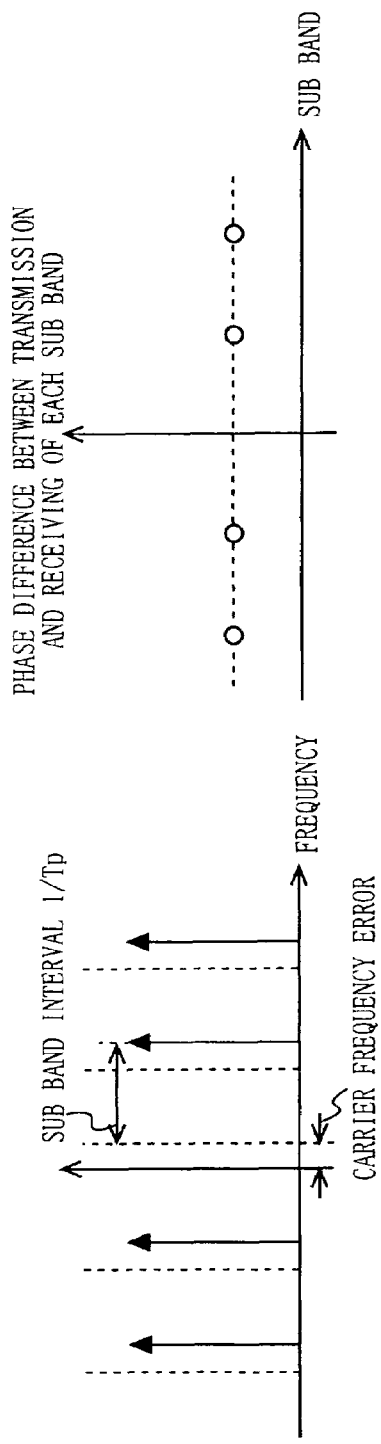

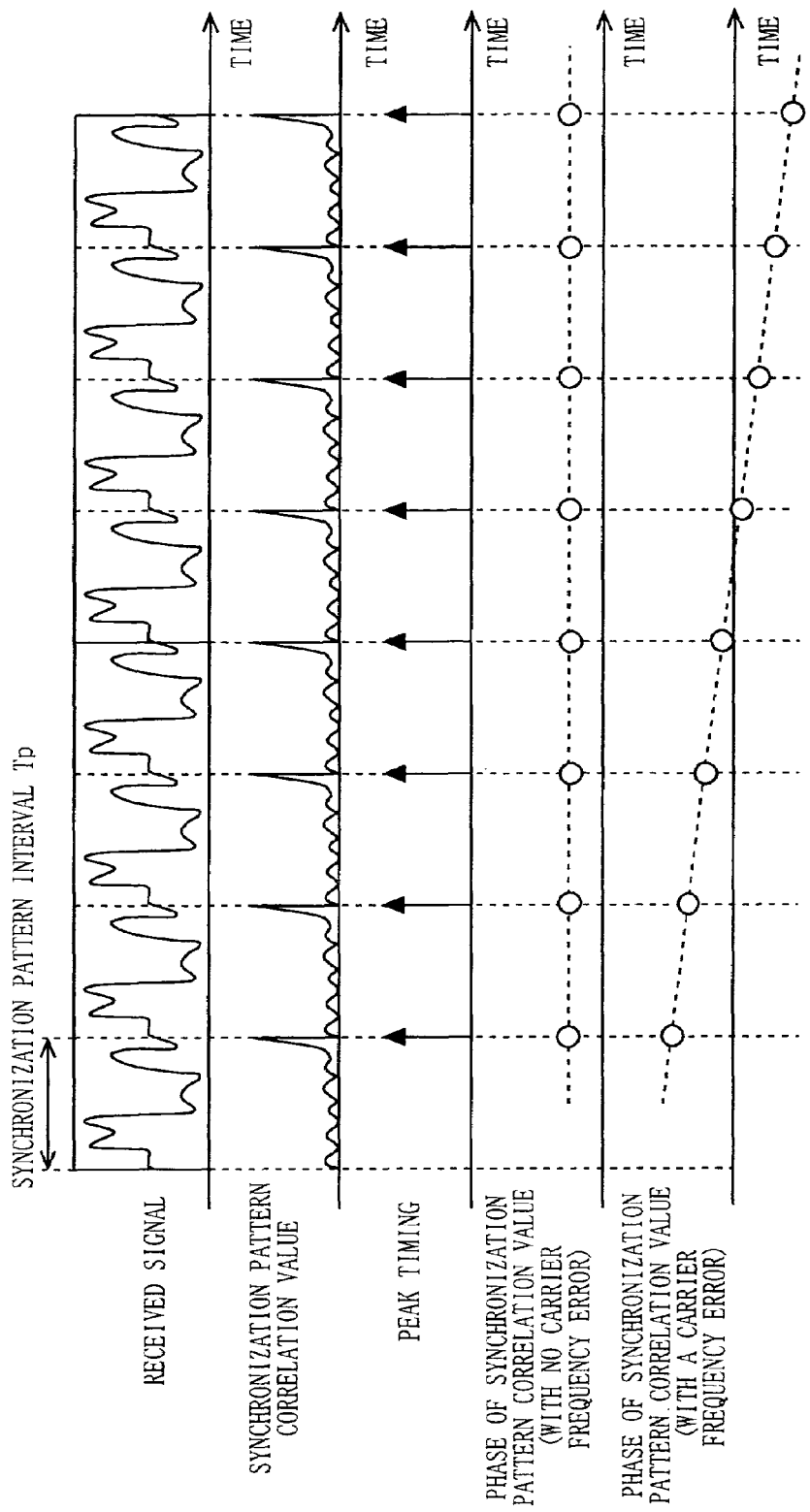

RECEPTION DEVICE

TECHNICAL FIELD

The present invention relates to a reception device in a wired or wireless transmission system adopting a multicarrier transmission system, and in particular to a reception device capable of correcting a carrier frequency error and a clock frequency error.

BACKGROUND ART

Recently, a multicarrier transmission system is a center of attention as a transmission system of digital signals. The multicarrier transmission system is a modulation system of serial/parallel-converting data to be transmitted to lower the symbol rate and then assigning data to an amplitude and a phase of a plurality of sub bands which are orthogonal to each other, so as to transmit the data. The multicarrier transmission system divides a transmission band into a plurality of sub bands for transmitting data. Accordingly, the multicarrier transmission system can vary the modulation system for each sub band, and therefore can flexibly use the frequency. The multicarrier transmission system also lowers the symbol rate, and therefore increases the resistance against the delay wave. For these reasons, the multicarrier transmission system is strong against multipath disturbance.

As a multicarrier transmission system, OFDM (orthogonal frequency division multiplexing), wavelet modulation using an orthogonal wavelet function, and the like have been proposed.

FIG. 10 shows a structure of a conventional OFDM reception device 210 disclosed in patent document 1. As shown in FIG. 10, the OFDM reception device 210 includes an A/D converter 201, a clock generation circuit 202, a complex multiplication circuit 203, a guard correlation calculation circuit 204, a numerical controlled oscillator (NCO) 205, a fast Fourier transform circuit 206, a carrier frequency error calculation circuit 207, a clock frequency reproduction circuit 208, and a data demodulation unit 209.

The A/D converter 201 samples a received signal and converts the received signal into a digital signal, based on a clock which is input from the clock generation circuit 202.

The complex multiplication circuit 203 multiples a complex sine wave signal which is input from the NCO 205 by the received signal converted into the digital signal, and corrects a frequency error.

The frequency error is first roughly estimated by the guard correlation calculation circuit 204. In order to increase the resistance against the delay wave, an OFDM signal includes a guard interval cyclically repeated in an OFDM symbol. The guard correlation calculation circuit 204 calculates a correlation value between an input OFDM signal and an OFDM signal delayed by an effective symbol time. The guard correlation calculation circuit 204 obtains a timing at which the correlation is peaked and a phase of the OFDM signal at that timing. Based on the obtained phase, the guard correlation calculation circuit 204 obtains a phase difference at an effective symbol time interval. The phase difference corresponds to the frequency error. Accordingly, the guard correlation calculation circuit 204 controls the NCO 205 so as to counteract the frequency error.

The timing at which the correlation is peaked represents an effective symbol interval. Based on the timing, the fast Fourier transform circuit 206 transforms an OFDM signal, having a rough frequency thereof corrected, into a signal in the frequency range, and outputs an amplitude and a phase of each of sub bands. The data demodulation unit 209 demodulates data of each sub band based on such an amplitude and phase.

An OFDM signal has a pilot signal, assigned a predetermined phase and amplitude, inserted into a predetermined sub band. In a conventional OFDM reception device, frequency error correction, equalization and the like are performed based on such a pilot signal.

The carrier frequency error calculation circuit 207 extracts only a predetermined pilot signal based on information on each sub band which is output from the fast Fourier transform circuit 206. The carrier frequency error calculation circuit 207 estimates a residual frequency error based on a phase change of the predetermined pilot signal. The carrier frequency error calculation circuit 207 controls the NCO 205 based on the residual frequency error. Thus, more precise carrier frequency synchronization is performed.

The clock frequency reproduction circuit 208 estimates a clock frequency error based on the phase change of the pilot signal. The clock frequency reproduction circuit 208 controls the clock generation circuit 202 based on the clock frequency error. Thus, the clock frequency error is corrected.

Patent Document 1: Japanese Laid-Open Patent Publication No. 10-308715

DISCLOSURE OF THE INVENTION

Problems to be Solved by the Invention

However, the above-described conventional structure needs to use the fast Fourier transform calculation circuit 206 in order to estimate a clock frequency error. The transform processing performed by the fast Fourier transform calculation circuit 206 requires a certain amount of time. Therefore, the conventional structure has a problem that a certain amount of time is necessary until the clock frequency control loop is converged.

With OFDM, when the carrier frequency error is large, sub bands may occasionally not be orthogonal to each other. This causes interference among the sub bands. As a result, there occurs a problem that the pilot signal cannot be accurately extracted even by Fourier transform. With the conventional structure, the rough frequency error is corrected using the guard interval correlation. However, in the case where the phase difference at the effective symbol time interval is used, only a frequency error of the sub band interval or smaller can be estimated. Therefore, for a frequency error larger than the sub band interval, a synchronization symbol for frequency error estimation needs to be additionally used.

With OFDM, rough frequency error estimation and effective symbol timing estimation can be performed using the guard interval correlation. However, with a modulation system which does not use the guard interval, such as wavelet modulation for performing multicarrier modulation using an orthogonal wavelet function or the like, it is necessary to especially use a synchronization symbol for performing frequency error estimation and effective symbol timing estimation.

Therefore, an object of the present invention is to provide a reception device capable of performing symbol timing estimation, carrier frequency error estimation, and clock frequency error estimation in a short period of time even when the carrier frequency error is large.

Solution to the Problems

To achieve the above objects, the present invention has the following aspects. A first aspect of the present invention is directed to a reception device for receiving a transmission frame including a synchronization symbol string, having a synchronization symbol repeated a plurality of times, inserted before a data symbol string. The synchronization symbol is a symbol obtained by synthesizing a plurality of sub band symbols which are orthogonal to each other and having different carrier frequencies. The carrier frequencies of the plurality of sub band symbols are located at an equal predetermined frequency interval. The synchronization symbol includes a synchronization pattern repeated at an interval of a reciprocal of the predetermined frequency interval. The reception device comprises a clock generation unit for generating a sampling clock; an analog/digital converter for sampling the transmission frame based on the sampling clock generated by the clock generation unit and analog/digital-converting the transmission frame; a frequency correction unit for correcting a frequency of an output from the analog/digital converter; a synchronization pattern correlation unit for obtaining a correlation between the output from the frequency correction unit and the synchronization pattern, and outputting the correlation as a synchronization pattern correlation value; a peak detection unit for detecting a peak of the output from the synchronization pattern correlation unit, and outputting the peak as a peak timing; a timing determination unit for outputting a predetermined timing in the synchronization symbol based on the peak timing which is output from the peak detection unit; an inter-synchronization pattern phase difference detection unit for detecting a change amount of a phase of the synchronization pattern correlation value which is output from the synchronization pattern correlation unit in accordance with the output from the timing determination unit and the peak timing which is output from the peak detection unit, and estimating an error of the frequency of the output from the analog/digital converter based on the change amount of the phase of the synchronization pattern correlation value; a plurality of sub band correlation units each for obtaining a correlation between a sub band symbol assigned thereto, among the plurality of sub band symbols, and the output from the frequency correction unit, and outputting the correlation as a sub band correlation; an inter-symbol phase difference detection unit for obtaining a phase difference at a predetermined symbol interval of the sub band correlation which is output from each of the plurality of sub band correlation units in accordance with the output from the timing determination unit, outputting the phase difference as an inter-symbol phase difference, and estimating an error of the frequency of the output from the analog/digital converter based on the inter-symbol phase difference; an inter-sub band phase difference detection unit for detecting a phase difference, among the sub bands, of the inter-symbol phase difference which is output from the inter-symbol phase difference detection unit as an inter-sub band phase difference in accordance with the output from the timing determination unit, and estimating an error of the sampling clock based on the detected inter-sub band phase difference; and a data demodulation unit for demodulating the output from the frequency correction unit in accordance with the output from the timing determination unit. The frequency correction unit corrects the frequency of the output from the analog/digital converter based on the frequency error estimated by the inter-synchronization pattern phase difference detection unit, and then corrects the frequency of the output from the analog/digital converter based on the frequency error estimated by the inter-symbol phase difference detection unit. The clock generation unit corrects a frequency of the sampling clock based on the error estimated by the inter-sub band phase difference detection unit.

Preferably, the timing determination unit may output a start timing of the synchronization symbol string when the peak timing which is output from the peak detection unit is detected at the synchronization pattern interval a predetermined number of times, and output a termination timing of the synchronization symbol string when the peak timing stops being detected at the synchronization pattern interval.

Preferably, the inter-synchronization pattern phase difference detection unit may average the change amounts of the phase of the synchronization pattern correlation value, estimate the frequency error of the output from the analog/digital converter, and when the start timing is output from the timing determination unit, terminate the averaging and input the estimated frequency error to the frequency correction unit.

Preferably, when the start timing is output from the timing detection unit, the inter-symbol phase difference detection unit may average the inter-symbol phase differences and estimate the frequency error of the output from the analog/digital converter.

Preferably, the inter-symbol phase difference detection unit may shorten the predetermined symbol interval when the frequency error is large and extend the predetermined symbol interval when the frequency error is small.

Preferably, the inter-sub band phase difference detection unit may average the inter-sub band phase differences and estimate the error of the sampling clock.

The present invention is effective for receiving a data symbol string which is multicarrier-modulated using an orthogonal wavelet function.

A second aspect of the present invention is directed to an integrated circuit for receiving a transmission frame including a synchronization symbol string, having a synchronization symbol repeated a plurality of times, inserted before a data symbol string. The synchronization symbol is a symbol obtained by synthesizing a plurality of sub band symbols which are orthogonal to each other and having different carrier frequencies. The carrier frequencies of the plurality of sub band symbols are located at an equal predetermined frequency interval. The synchronization symbol includes a synchronization pattern repeated at an interval of a reciprocal of the predetermined frequency interval. The reception device comprises a clock generation unit for generating a sampling clock; an analog/digital converter for sampling the transmission frame based on the sampling clock generated by the clock generation unit and analog/digital-converting the transmission frame; a frequency correction unit for correcting a frequency of an output from the analog/digital converter; a synchronization pattern correlation unit for obtaining a correlation between the output from the frequency correction unit and the synchronization pattern, and outputting the correlation as a synchronization pattern correlation value; a peak detection unit for detecting a peak of the output from the synchronization pattern correlation unit, and outputting the peak as a peak timing; a timing determination unit for outputting a predetermined timing in the synchronization symbol based on the peak timing which is output from the peak detection unit; an inter-synchronization pattern phase difference detection unit for detecting a change amount of a phase of the synchronization pattern correlation value which is output from the synchronization pattern correlation unit in accordance with the output from the timing determination unit and the peak timing which is output from the peak detection unit, and estimating an error of the frequency of the output from the analog/digital converter based on the change amount of the phase of the synchronization pattern correlation value; a plurality of sub band correlation units each for obtaining a correlation between a sub band symbol assigned thereto, among the plurality of sub band symbols, and the output from the frequency correction unit, and outputting the correlation as a sub band correlation; an inter-symbol phase difference detection unit for obtaining a phase difference at a predetermined symbol interval of the sub band correlation which is output from each of the plurality of sub band correlation units in accordance with the output from the timing determination unit, outputting the phase difference as an inter-symbol phase difference, and estimating an error of the frequency of the output from the analog/digital converter based on the inter-symbol phase difference; an inter-sub band phase difference detection unit for detecting a phase difference, among the sub bands, of the inter-symbol phase difference which is output from the inter-symbol phase difference detection unit as an inter-sub band phase difference in accordance with the output from the timing determination unit, and estimating an error of the sampling clock based on the detected inter-sub band phase difference; and a data demodulation unit for demodulating the output from the frequency correction unit in accordance with the output from the timing determination unit. The frequency correction unit corrects the frequency of the output from the analog/digital converter based on the frequency error estimated by the inter-synchronization pattern phase difference detection unit, and then corrects the frequency of the output from the analog/digital converter based on the frequency error estimated by the inter-symbol phase difference detection unit. The clock generation unit corrects a frequency of the sampling clock based on the error estimated by the inter-sub band phase difference detection unit.

A third aspect of the present invention is directed to a method for receiving a transmission frame including a synchronization symbol string, having a synchronization symbol repeated a plurality of times, inserted before a data symbol string. The synchronization symbol is a symbol obtained by synthesizing a plurality of sub band symbols which are orthogonal to each other and having different carrier frequencies. The carrier frequencies of the plurality of sub band symbols are located at an equal predetermined frequency interval. The synchronization symbol includes a synchronization pattern repeated at an interval of a reciprocal of the predetermined frequency interval. The method comprises sampling and analog/digital-converting a transmission frame; obtaining a correlation between the analog/digital-converted signal and the synchronization pattern, and setting the correlation as a synchronization pattern correlation value; detecting a peak of the synchronization pattern correlation value, and setting the peak as a peak timing; detecting a predetermined timing in the synchronization symbol based on the peak timing; detecting a change amount of a phase of the synchronization pattern correlation value in accordance with the predetermined timing and the peak timing, and estimating an error of a frequency of the output from an analog/digital converter based on the change amount of the phase of the synchronization pattern correlation value; obtaining a correlation between each of at least two sub band symbols, among the plurality of sub band symbols, and the signal with the frequency corrected, and setting the correlations as at least two sub band correlations; obtaining a phase difference at a predetermined symbol interval of each of the sub band correlations in accordance with the predetermined timing, and setting the phase difference as an inter-symbol phase difference; estimating an error of the frequency of the output from the analog/digital converter based on the inter-symbol phase difference; setting a phase difference, among the sub bands, of the inter-symbol phase difference in accordance with the predetermined timing as an inter-sub band phase difference; estimating an error of the sampling clock based on the inter-sub band phase difference; correcting the frequency of the analog/digital-converted signal based on the error of the frequency estimated based on the change amount of the phase of the synchronization pattern correlation value; correcting the frequency of the analog/digital-converted signal based on the error of the frequency estimated based on the inter-symbol pattern phase difference; correcting the frequency of the sampling clock based on the error of the sampling clock estimated based on the inter-sub band phase difference; and demodulating the corrected analog/digital-converted signal.

A fourth aspect of the present invention is directed to a program executed by a computer device for receiving a transmission frame including a synchronization symbol string, having a synchronization symbol repeated a plurality of times, inserted before a data symbol string. The synchronization symbol is a symbol obtained by synthesizing a plurality of sub band symbols which are orthogonal to each other and having different carrier frequencies. The carrier frequencies of the plurality of sub band symbols are located at an equal predetermined frequency interval. The synchronization symbol includes a synchronization pattern repeated at an interval of a reciprocal of the predetermined frequency interval. The program causes the computer device to execute the steps of sampling and analog/digital-converting a transmission frame; obtaining a correlation between the analog/digital-converted signal and the synchronization pattern, and setting the correlation as a synchronization pattern correlation value; detecting a peak of the synchronization pattern correlation value, and setting the peak as a peak timing; detecting a predetermined timing in the synchronization symbol based on the peak timing; detecting a change amount of a phase of the synchronization pattern correlation value in accordance with the predetermined timing and the peak timing, and estimating an error of a frequency of the output from an analog/digital converter based on the change amount of the phase of the synchronization pattern correlation value; obtaining a correlation between each of at least two sub band symbols, among the plurality of sub band symbols, and the signal with the frequency corrected, and setting the correlations as at least two sub band correlations; obtaining a phase difference at a predetermined symbol interval of each of the sub band correlations in accordance with the predetermined timing, and setting the phase difference as an inter-symbol phase difference; estimating an error of the frequency of the output from the analog/digital converter based on the inter-symbol phase difference; setting a phase difference, among the sub bands, of the inter-symbol phase difference in accordance with the predetermined timing as an inter-sub band phase difference; estimating an error of the sampling clock based on the inter-sub band phase difference; correcting the frequency of the analog/digital-converted signal based on the error of the frequency estimated based on the change amount of the phase of the synchronization pattern correlation value; correcting the frequency of the analog/digital-converted signal based on the error of the frequency estimated based on the inter-symbol pattern phase difference; correcting the frequency of the sampling clock based on the error of the sampling clock estimated based on the inter-sub band phase difference; and demodulating the corrected analog/digital-converted signal.

EFFECT OF THE INVENTION

According to the present invention, the reception device first detects a carrier frequency error based on a phase difference of a synchronization pattern correlation value at a synchronization pattern interval which is shorter than a symbol interval, and corrects an error of a receiving frequency. Thus, a rough carrier frequency error is corrected. Next, the reception device detects a residual frequency error based on a phase change of the correlation of a sub band symbol. Since the rough carrier frequency is already corrected, the reception device can detect the residual frequency error with high precision. The reception device corrects an error of the receiving frequency based on the detected residual frequency error. Thus, even when the carrier frequency error is large, the reception device can correct the carrier frequency error with high precision. The reception device obtains an inter-sub band phase difference based on an inter-symbol phase difference of each sub band, and detects a sampling clock frequency error based on the inter-sub band phase difference and detects the sampling clock frequency error. Thus, the demodulation error in the data symbol can be reduced. The reception device can detect a timing, a carrier frequency error, and a clock frequency error using one, same synchronization symbol. Therefore, the reception device can establish synchronization with the transmission side in a short period of time.

The reception device can determine the timing at which the synchronization symbol string starts and terminates. Therefore, the reception device can quickly correct the carrier frequency error and the clock frequency error in accordance with such timings.

The reception device estimates the rough carrier frequency error by averaging the change amounts of the phase of the synchronization pattern correlation value, and when the start timing of the synchronization symbol string arrives, makes a correction based on the rough carrier frequency error. Therefore, the subsequent carrier frequency error can be estimated with high precision.

The reception device estimates the carrier frequency error by averaging the inter-symbol phase differences. Therefore, the carrier frequency error can be estimated with high precision.

The reception device estimates the clock frequency error by averaging the inter-sub band phase differences. Therefore, the clock frequency error can be estimated with high precision.

The reception device shortens the time interval between symbols used for comparison in order to obtain an inter-symbol phase difference when the frequency error is large, and extends the time interval between symbols used for comparison in order to obtain an inter-symbol phase difference when the frequency error is small. Therefore, the carrier frequency error can be estimated with high precision in accordance with the time of reception of the transmission frame.

With multicarrier modulation using an orthogonal wavelet function, the subcarrier interval can be made narrower than that of OFDM modulation. When the subcarrier interval is narrower, the sidelobe is more steeper. This makes it difficult to correct a wide range of carrier frequency errors and clock frequency errors using a pilot signal. Therefore, the carrier frequency correction and the clock frequency error correction using a synchronization symbol string according to the present invention is effective for receiving a data symbol string multicarrier-modulated using an orthogonal wavelet function.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4A shows a case where no carrier frequency error or clock frequency error is generated.

FIG. 4B shows a case where a carrier frequency error is generated at the time of receiving.

FIG. 5 illustrates an operation of an inter-synchronization pattern phase difference detection unit 107.

DESCRIPTION OF THE REFERENCE CHARACTERS

Figure 1:
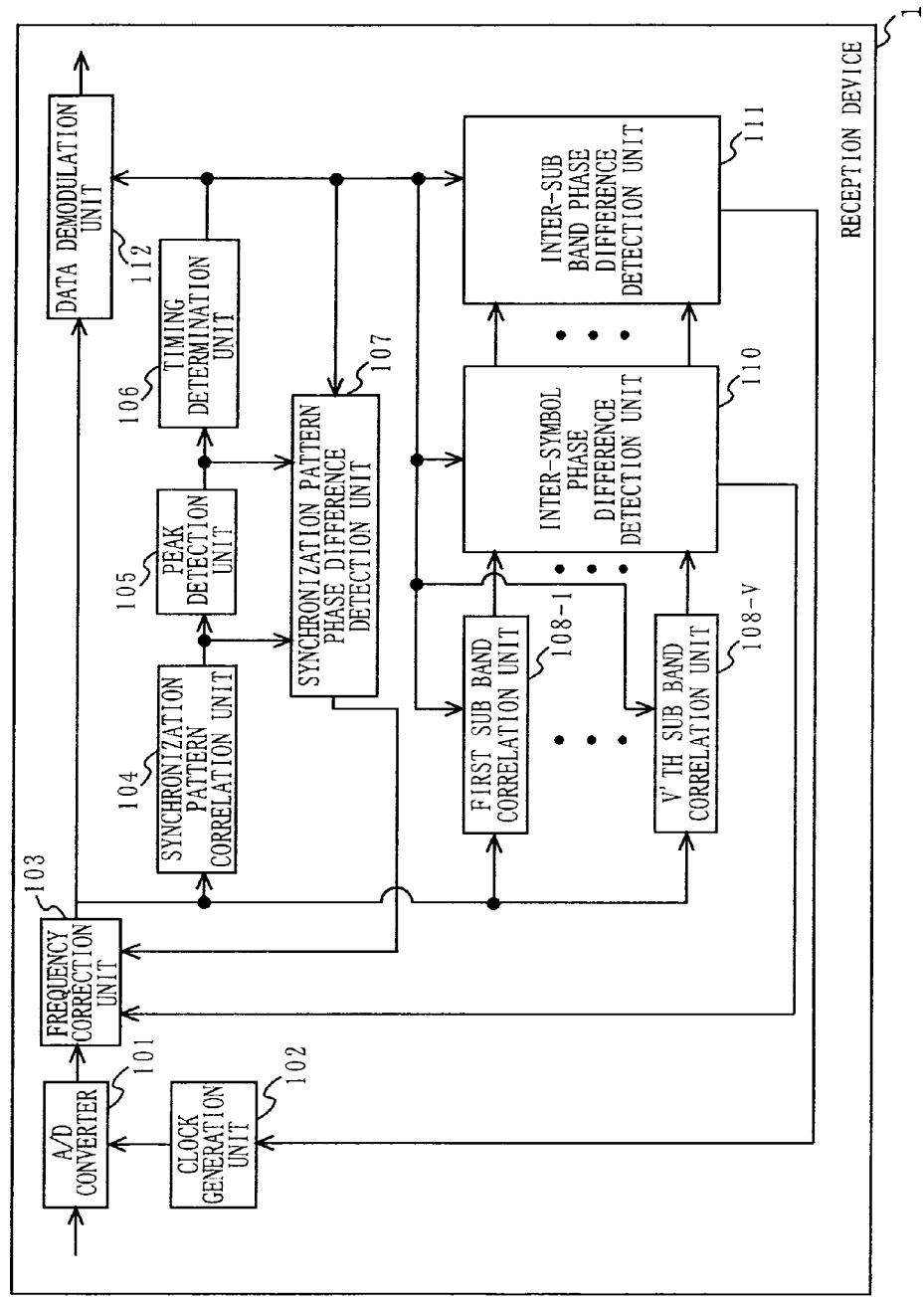
FIG. 1 is a block diagram showing a functional structure of a reception device 1 according to an embodiment of the present invention.

101 A/D converter
102 Clock generation unit
103 Frequency correction unit
104 Synchronization pattern correlation unit
105 Peak detection unit
106 Timing determination unit
107 Inter-synchronization pattern phase difference detection unit
108-1 through 108-V Sub band correlation unit
110 Inter-symbol phase difference detection unit
111 Inter-sub band phase difference detection unit
112 Data demodulation unit

BEST MODE FOR CARRYING OUT THE INVENTION

Hereinafter, the present invention will be described by way of embodiments with reference to the drawings.

FIG. 1 is a block diagram showing a functional structure of a reception device 1 according to one embodiment of the present invention. As shown in FIG. 1, the reception device 1 includes an A/D converter 101, a clock generation unit 102, a frequency correction unit 103, a synchronization pattern correlation unit 104, a peak detection unit 105, a timing determination unit 106, an inter-synchronization pattern phase difference detection unit 107, first through V'th sub band correlation units 108-1 through 108-V (where V is an integer of at least 2), an inter-symbol phase difference detection unit 110, an inter-sub band phase difference detection unit 111, and a data demodulation unit 112.

Figure 2:
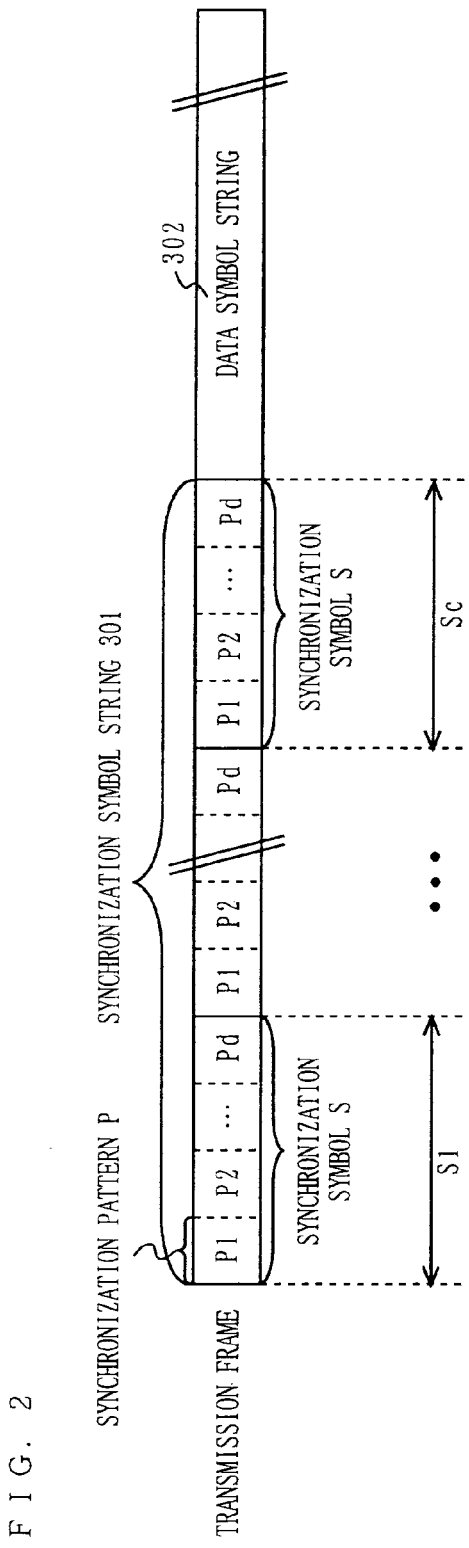
FIG. 2 shows an example of a transmission frame received by the reception device 1.

FIG. 2 shows an example of a transmission frame received by the reception device 1. The transmission frame includes a synchronization symbol string 301 and a data symbol string 302. The synchronization symbol string 301 includes c number of synchronization symbols S (where c is an integer of at least 2). In the synchronization symbol string 301, the synchronization symbols S are represented as a synchronization symbol S1, a synchronization symbol S2, ..., and a synchronization symbol Sc sequentially from a leading synchronization symbol. Each synchronization symbol S includes d number of synchronization patterns P (where d is an integer of at least 2). The value of d is determined based on the frequency of the sub band used for the synchronization symbol. In each synchronization symbol S, the synchronization patterns P are represented as a synchronization pattern P1, a synchronization pattern P2, ..., and a synchronization pattern Pd sequentially from a leading synchronization pattern. The synchronization symbol string 301 is a signal having the synchronization pattern P repeated d×c times.

With reference to FIG. 1 and FIG. 2, an overview of an operation of the reception device 1 will be described.

The reception device 1 down-converts a received signal and inputs the down-converted received signal to the A/D converter 101. The A/D converter 101 performs analog/digital conversion of the received signal based on a clock generated by the clock generation unit 102.

The center frequency of the received signal which is input to the A/D converter 101 may occasionally shifted from a desired center frequency. Such a shift is caused mainly by a shift in the carrier frequency at the time of up-conversion on the transmission side and/or a shift in the local oscillation frequency at the time of down-conversion on the receiving side. Hereinafter, the shift in the center frequency will be referred to as a "carrier frequency error".

The received signal converted into a digital signal is frequency-corrected by the frequency correction unit 103. The frequency correction unit 103 corrects the center frequency of the received signal (herein after, referred to as a "receiving frequency") based on the frequency error detected on a subsequent stage.

There is no specific limitation on the method of frequency correction carried out by the frequency correction unit 103. For example, in the case where the received signal which is subjected to the analog/digital conversion and is output from the A/D converter 101 is represented with a complex number, the frequency correction unit 103 corrects the receiving frequency by multiplying the received signal by a complex sine wave in accordance with the frequency error. Alternatively, the frequency correction unit 103 may correct the receiving frequency by directly changing the phase of the received signal using a CORDIC algorithm. In the case where the received signal is represented with a real number, the frequency correction unit 103 may correct the receiving frequency by multiplying the received signal by a sine wave in accordance with the frequency error and extracting only a desired signal from the multiplication result with a filter. Alternatively, the frequency correction unit 103 may correct the receiving frequency by converting the received signal into a signal represented with a complex number using Hilbert conversion and multiplying the received signal by a complex sine wave in accordance with the frequency error.

The synchronization pattern correlation unit 104 obtains cross correlation between the output from the frequency correction unit 103 and the synchronization pattern P, and outputs the obtained cross correlation as a synchronization pattern correlation value. Thus, the synchronization pattern correlation unit 104 outputs a peak of the synchronization pattern correlation value at the timing when the received signal and the synchronization pattern P match each other.

The peak detection unit 105 detects the peak of the synchronization pattern correlation value which is output from the synchronization pattern correlation unit 104, and outputs the detection result. Hereinafter, the time at which the synchronization pattern correlation value is peaked will be referred to as a "peak timing". Hereinafter, the expression that "the peak detection unit 105 outputs a peak timing as the detection result" will be used.

In the case where a carrier frequency error is generated, the phases of a first synchronization pattern correlation value and a second synchronization pattern correlation value at a first peak timing and a second peak timing which are time-wise adjacent to each other (first and second phases) do not match and are shifted from each other. Hereinafter, the shift between the first and second phases will be referred to as an "inter-synchronization pattern phase difference".

The inter-synchronization pattern phase difference detection unit 107 acquires a synchronization pattern correlation value, which is output from the synchronization pattern correlation unit 104, at each peak timing which is output from the peak detection unit 105. Upon acquiring the synchronization pattern correlation value, the inter-synchronization pattern phase difference detection unit 107 obtains a difference between the phase of the acquired synchronization pattern correlation value and the phase of synchronization pattern correlation value acquired at the immediately previous timing, and sets the obtained difference as an inter-synchronization pattern phase difference. A phase change of the synchronization pattern correlation value obtained at each peak timing generally corresponds to the carrier frequency error. Therefore, the carrier frequency error can be roughly estimated based on the inter-synchronization pattern phase difference. The inter-synchronization pattern phase difference detection unit 107 roughly estimates the carrier frequency error based on the inter-synchronization pattern phase difference.

The timing determination unit 106 determines a predetermined timing at which the synchronization symbol arrives based on the peak timing which is output from the peak detection unit 105. Herein, it is assumed that there are three types of predetermined timing, i.e., a synchronization symbol start timing at which the synchronization symbol is started, a synchronization symbol timing at which the synchronization symbol arrives, and a synchronization symbol termination timing at which the synchronization symbol terminates. When the peak timing is detected at a time interval of the synchronization pattern P a predetermined number of times (d times in the example shown in FIG. 2), the timing determination unit 106 determines that the synchronization symbol string has started and outputs the determination result as the synchronization symbol start timing. When the peak timing stops being detected at the time interval of the synchronization pattern P, the timing determination unit 106 determines that the synchronization symbol string has terminated and outputs the determination result as the synchronization symbol termination timing. The timing determination unit 106 outputs a synchronization symbol timing at the time interval of the synchronization symbol S from the synchronization symbol start timing until the synchronization symbol termination timing.

When the synchronization symbol start timing is input from the timing determination unit 106, the inter-synchronization pattern phase difference detection unit 107 holds the rough carrier frequency error estimated so far, and inputs the held rough carrier frequency error to the frequency correction unit 103.

When the rough carrier frequency errors is input from the inter-synchronization pattern phase difference detection unit 107, the frequency correction unit 103 corrects the center frequency (receiving frequency) of a received signal which is received after that, based on the rough carrier frequency error.

After the synchronization symbol start timing is detected, the received signal corrected in terms of the center frequency by the frequency correction unit 103 is input to the first through V'th sub band correlation units 108-1 through 108-V.

The v'th (v is an integer of 1 through V) sub band correlation unit 108-v obtains cross correlation between the symbol of the k'th sub band included in the received signal and a known symbol of the k'th sub band forming the synchronization symbol. The cross correlation obtained by the v'th sub band correlation unit 108-v will be referred to as "v'th sub band correlation". For example, it is assumed that the v'th sub band correlation unit 108-v is assigned a base of the k'th sub band. The v'th sub band correlation unit 108-v multiples the received signal by the base of the k'th sub band and thus extracts the symbol of the k'th sub band included in the received signal. The v'th sub band correlation unit 108-v obtains cross correlation between the extracted symbol of the k'th sub band and the known symbol of the k'th sub band, and outputs the v'th sub band correlation.

When the synchronization symbol start timing arrives, the frequency correction unit 103 corrects the receiving frequency based on the rough carrier frequency error from the inter-synchronization pattern phase difference detection unit 107. However, in the case where there is a frequency error which cannot be corrected by the rough carrier frequency error (herein after, referred to as a "residual frequency error"), the frequencies of all the sub bands are shifted by the residual frequency error. The shift of the frequencies of the sub bands causes a phase rotation of the same amount in all the sub bands at each symbol time. The "symbol time" means the time interval of one type of symbol. In the case where the synchronization symbol string 301 is received, the time interval of the synchronization symbol S is the symbol time.

In the case where the frequency of the clock which is output from the clock generation unit 102 (herein after, referred to as a "clock frequency") has an error, a phase rotation is caused in each sub band in accordance with the frequency of the sub band at each symbol time.

At each symbol time, the inter-symbol phase difference detection unit 110 detects a difference between the phase at the current symbol time and the phase at the immediately previous symbol time regarding each of the first through V'th sub band correlations which are output from the first through V'th sub band correlation units 108-1 through 108-V. The inter-symbol phase difference detection unit 110 sets the detected difference respectively as the first through V'th inter-symbol phase differences. The inter-symbol phase difference detection unit 110 averages the first through V'th inter-symbol phase differences, and thus estimates a residual frequency error. The inter-symbol phase difference detection unit 110 holds the estimated residual frequency error and inputs the residual frequency error to the frequency correction unit 103.

The frequency correction unit 103 corrects the rough frequency error estimated before with the residual frequency error, and corrects a receiving frequency which is received after that.

The inter-symbol phase difference detection unit 110 inputs the first through V'th inter-symbol phase differences to the inter-sub band phase difference detection unit 111 at each symbol time.

The inter-sub band phase difference detection unit 111 obtains differences between arbitrary combinations among the first through V'th inter-symbol phase differences of the first through V'th sub bands, averages the obtained differences, and detects the average value as an inter-sub band phase difference. The inter-sub band phase difference detection unit 111 detects a phase rotation amount in accordance with the frequency of each sub band, based on the inter-sub band phase difference, and thus estimates an error of the clock frequency (herein after, referred to as a "clock frequency error"). When the synchronization symbol termination timing is detected by the timing determination unit 106, the inter-sub band phase difference detection unit 111 holds the estimated clock frequency error and inputs the clock frequency error to the clock generation unit 102.

The clock generation unit 102 generates a clock based on the clock frequency error, and corrects the clock frequency for sampling a received signal which is received after that.

After the synchronization symbol termination timing is detected, the sampling clock of the received signal is corrected, and a data symbol having the corrected receiving frequency is input to the data demodulation unit 112. When the synchronization symbol termination timing is detected by the timing determination unit 106, the data demodulation unit 112 demodulates the input data symbol and outputs received data.

Next, a detailed operation of each unit will be described.

Figure 3A:
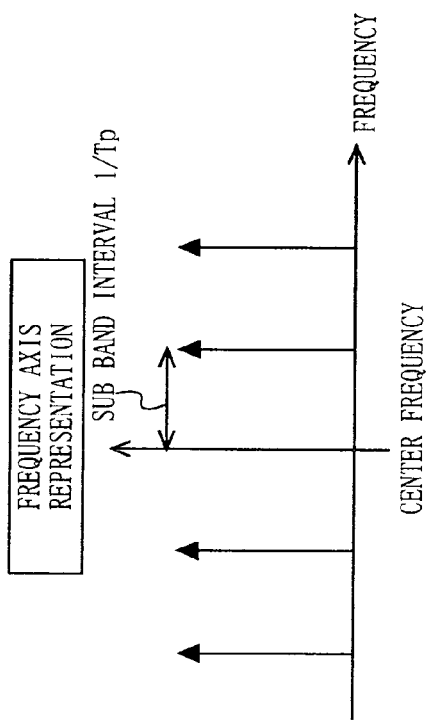
FIG. 3A schematically shows a frequency axis representation of a synchronization symbol S.
Figure 3B:
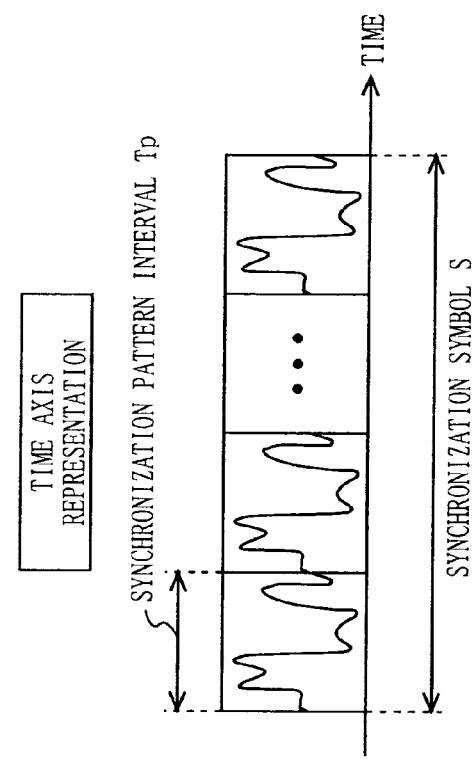
FIG. 3B schematically shows a time axis representation of the synchronization symbol obtained by synthesizing sub band symbols located along the frequency axis as shown in FIG. 3A.

FIG. 3A and FIG. 3B illustrate a synchronization symbol S used in this embodiment. The synchronization symbol S is a symbol obtained by synthesizing a plurality of sub band symbols which are orthogonal to each other and have different carrier frequencies.

FIG. 3A schematically shows a frequency axis representation of the synchronization symbol S. In FIG. 3A, there are five sub bands, although the central sub band is not used. The sub band symbols are located at a predetermined sub band interval 1/Tp. Each sub band symbol is assigned a predetermined phase and amplitude. The sub band symbols only need to be orthogonal to each other, and may be symbols using a complex sine wave such as a Fourier series, or symbols by a wave let using an orthogonal wavelet function.

FIG. 3B schematically shows a time axis representation of the synchronization symbol obtained by synthesizing the sub band symbols located along the frequency axis as shown in FIG. 3A. Where the sub band interval is 1/Tp, a pattern appears repeatedly at an interval of Tp, which is a reciprocal of 1/Tp, along the time axis. This pattern appearing repeatedly is the synchronization pattern. The synchronization symbol needs to be a symbol obtained by synthesizing at least two sub band symbols.

The synchronization symbol will be specifically described using expressions. Where the sub band number is k, the sub band complex vectors as a predetermined pattern is $a_k$, and the orthogonal base vectors are $b_k$, the synchronization symbol S is represented by expression 1. In expression 1, the synchronization symbol S is a synthesized signal of $a_k b_k$ of all the sub bands. A predetermined phase and amplitude assigned to each sub band symbol is determined based on the sub band complex vector $a_k$.

$$S = \sum_k a_k b_k \qquad \text{Expression 1}$$

As the orthogonal base vectors $b_k$, orthogonal base vectors which are orthogonal to each other can be used. Expression 2 is the condition for $b_k$ to be orthogonal base vectors.

$$\sum b_i b_j^* = \begin{cases} 1 & (i = j) \\ 0 & (i \neq j) \end{cases} \qquad \text{Expression 2}$$

For example, the followings are usable as the orthogonal base vectors $b_k$: orthogonal base vectors by discrete Fourier transform (DFT) represented by expression 3, orthogonal base vectors by discrete cosine transform (DCT) represented by expression 4, and orthogonal base vectors by discrete wavelet transform (DWT) represented by expression 5.

$$b_k = \exp\left(j\frac{2\pi k n t}{N}\right) \qquad \text{Expression 3}$$

$$b_k = \cos\left(\frac{2\pi k n t}{N}\right) \qquad \text{Expression 4}$$

$$b_k = \Psi(a_0^{-k} n t - m b_0) \qquad \text{Expression 5}$$

$$b_k = \Psi(a_0^{-k} n t - m b_0) \qquad \text{Expression 5}$$

In the above expressions, k is the sub band number (i.e., the value corresponding to the frequency of the sub band), n is the sample number, t is the sample time, N is the number of points (i.e., the value representing the number of samples in the time range, and the value representing the number of sub bands in the frequency range), $a_0^{-k}$ is the scaling coefficient, $a_0$ is a constant, $mb_0$ is the shift coefficient, m is an integer, and $b_0$ is a constant.

Figure 4C:
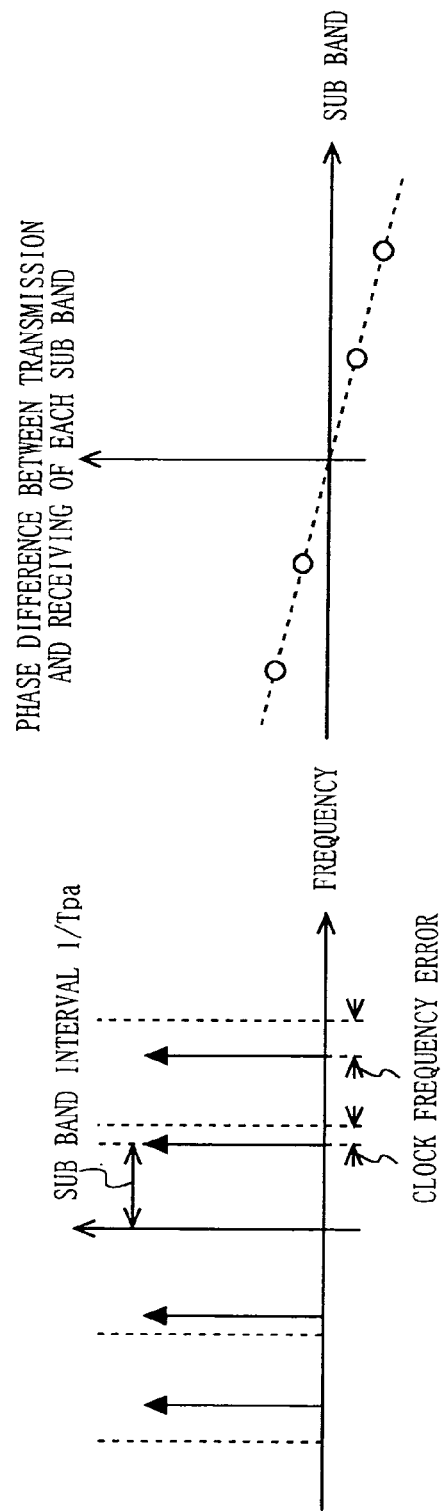
FIG. 4C shows a case where a clock frequency error is generated at the time of receiving.

FIG. 4A, FIG. 4B and FIG. 4C are provided for illustrating the synchronization symbol S as shown in FIG. 3A and FIG. 3B, which is received in the state where a carrier frequency error and a clock frequency error are generated.

FIG. 4A shows a case where no carrier frequency error or clock frequency error is generated. The received signal in the left graph of FIG. 4 matches the transmission signal in FIG. 3A. Accordingly, as shown in the right graph of FIG. 4A, the phase difference between transmission and receiving is 0 in all the sub bands. The "phase difference between transmission and receiving" means a difference between the phase of a sub band symbol before being up-converted on the transmission side and the phase of a sub band symbol after being down-converted on the receiving side.

FIG. 4B shows a case where a carrier frequency error is generated at the time of receiving. As shown in the left graph of FIG. 4B, the received signal is frequency-shifted by the same amount in all the sub bands due to the carrier frequency error. Due to the frequency shift, the phase of each sub band symbol is shifted on the receiving side. The shift of the phase of the sub band symbol is of the same amount in all the sub bands. Accordingly, as shown in the right graph of FIG. 4B, the phase difference between transmission and receiving is the same in all the sub bands.

FIG. 4C shows a case where a clock frequency error is generated at the time of receiving. When the clock frequency is shifted, the sampling interval is changed. Therefore, the synchronization pattern interval is changed to Tpa on the receiving side. Accordingly, the sub band interval of the received signal is 1/Tpa, and the shift amount of the frequency varies in proportion to the sub band frequency. As a result, the phase difference between transmission and receiving in each sub band changes as shown in the right graph of FIG. 4C in proportion to the sub band frequency.

Therefore, the carrier frequency error and the clock frequency error can be estimated by detecting the phase difference between transmission and receiving of each sub band.

The synchronization pattern correlation unit 104 calculates a complex correlation value (synchronization pattern correlation value) between the received signal and the synchronization pattern repeated at the interval Tp. Thus, the peak of the complex correlation value (synchronization pattern correlation value) appears at the timing when the waveform of the received signal and the waveform of the synchronization pattern match each other.

In the case where there is no carrier frequency error, the phase of the complex correlation value (synchronization pattern correlation value) does not change as time passes.

In the case where there is a carrier frequency error, a phase rotation is generated in accordance with the carrier frequency error. Therefore, the phase of the complex correlation value (synchronization pattern correlation value) changes at each peak timing. By finding the change amount of the phase of the complex correlation value at each peak timing, i.e., at each synchronization pattern interval Tp, a rough carrier frequency error equal to or less than 1/Tp can be obtained. The reason is as follows. When the phase difference at the time interval Tp is equal to or greater than n, it cannot be found in which direction the phase has rotated (whether the frequency difference has a positive value or a negative value). Accordingly, the range in which the phase can be detected at the time interval Tp is $-\pi<\theta<\pi$. For example, when the time interval Tp=1[sec], where the phase difference is $\pm\pi$, the phase is rotated once in 2 [sec]. This is why the frequency difference is $\pm0.5$ Hz. Accordingly, in this example, the range in which the frequency error can be detected is 1/Tp=1 Hz. Therefore, by finding the change amount of the phase of the complex correlation value at each synchronization pattern interval Tp, a rough carrier frequency error equal to or less than 1/Tp can be obtained. The lower limit depends on the calculation precision.

For example, a sub band signal $S_k$ using orthogonal bases by discrete Fourier transform will be described. Where the band of the sub band $S_k$ is $W_k$, the sub band signal $S_k$ is represented by expression 6.

$$S_k = a_k e^{jW_k n t} \qquad \text{Expression 6}$$

Here, the carrier frequency error is $\Delta f$, and the sampling time error due to the clock frequency error (herein after, referred to simply as a "clock frequency error") is $\Delta t$. In this case, the received sub band signal $r_k$ is represented by expression 7.

$$r_k = a_k e^{jW_k n(t+\Delta t)} e^{j2\pi\Delta f n(t+\Delta t)} \qquad \text{Expression 7}$$

The correlation between the transmitted sub band signal $S_k$ and the received sub band signal $r_k$ is represented by expression 8.

$$c_k = \Sigma r_k S_k^* = \Sigma r_k (a_k e^{jW_k n t})^* = \alpha e^{j(W_k n \Delta t + 2\pi\Delta f n(t+\Delta t)+\phi)} \qquad \text{Expression 8}$$

Here, $\alpha$ becomes maximum at the timing when $\alpha$ matches the symbol interval of the transmitted signal $S_k$. $\phi$ is the average of the phase rotation amounts at the symbol interval.

The received signal is a synthesized signal of all the sub band signals $S_k$. Therefore, the synchronization pattern correlation value obtained by the synchronization pattern correlation unit 104 is a synthesis of expression 8 for all the sub bands. It is understood from expression 8 that when there is no carrier frequency error Δf, the synchronization pattern correlation value does not change as time passes. It is also understood that when there is a carrier frequency error Δf, a phase rotation occurs in the synchronization pattern correlation value in accordance with the carrier frequency error. This is also appreciated when orthogonal bases by other types of transform than discrete Fourier transform are used.

FIG. 5 illustrates an operation of the inter-synchronization pattern phase difference detection unit 107. As shown in FIG. 5, a received signal has the synchronization pattern P repeated at the synchronization pattern interval Tp. The synchronization pattern correlation unit 104 outputs a correlation value between the received signal and the synchronization pattern (the synchronization pattern correlation value). The peak detection unit 105 outputs a peak timing at the peak of the synchronization pattern correlation value.

As shown in FIG. 5, when there is no carrier frequency error, the phase of the synchronization pattern correlation value does not change. By contrast, when there is a carrier frequency error, the phase of the synchronization pattern correlation value changes. The change amount of the phase of the synchronization pattern correlation value corresponds to the carrier frequency error. This is appreciated from, for example, expression 8. The inter-synchronization pattern phase difference detection unit 107 obtains a rough carrier frequency error equal to or less than 1/Tp based on the change amount of the phase of the synchronization pattern correlation value.

The inter-synchronization pattern phase difference detection unit 107 obtains a difference in the synchronization pattern correlation value between adjacent synchronization patterns in accordance with the peak timing as an inter-synchronization pattern phase difference, and sets the obtained inter-synchronization pattern phase difference as a phase change amount. The inter-synchronization pattern phase difference detection unit 107 averages the phase change amounts between a plurality of synchronization patterns, and estimates the carrier frequency error based on the averaged phase change amount.

When the synchronization symbol start timing is detected by the timing determination unit 106, the inter-synchronization pattern phase difference detection unit 107 holds the carrier frequency error based on the phase change amount which is averaged before the synchronization symbol start timing is detected, and inputs the held carrier frequency error to the frequency correction unit 103.

The frequency correction unit 103 corrects the receiving frequency after the synchronization symbol start timing is detected based on the carrier frequency error held by the inter-synchronization pattern phase difference detection unit 107.

The timing determination unit 106 determines the start and the termination of the synchronization symbol based on the output from the peak detection unit 105.

Figure 6:
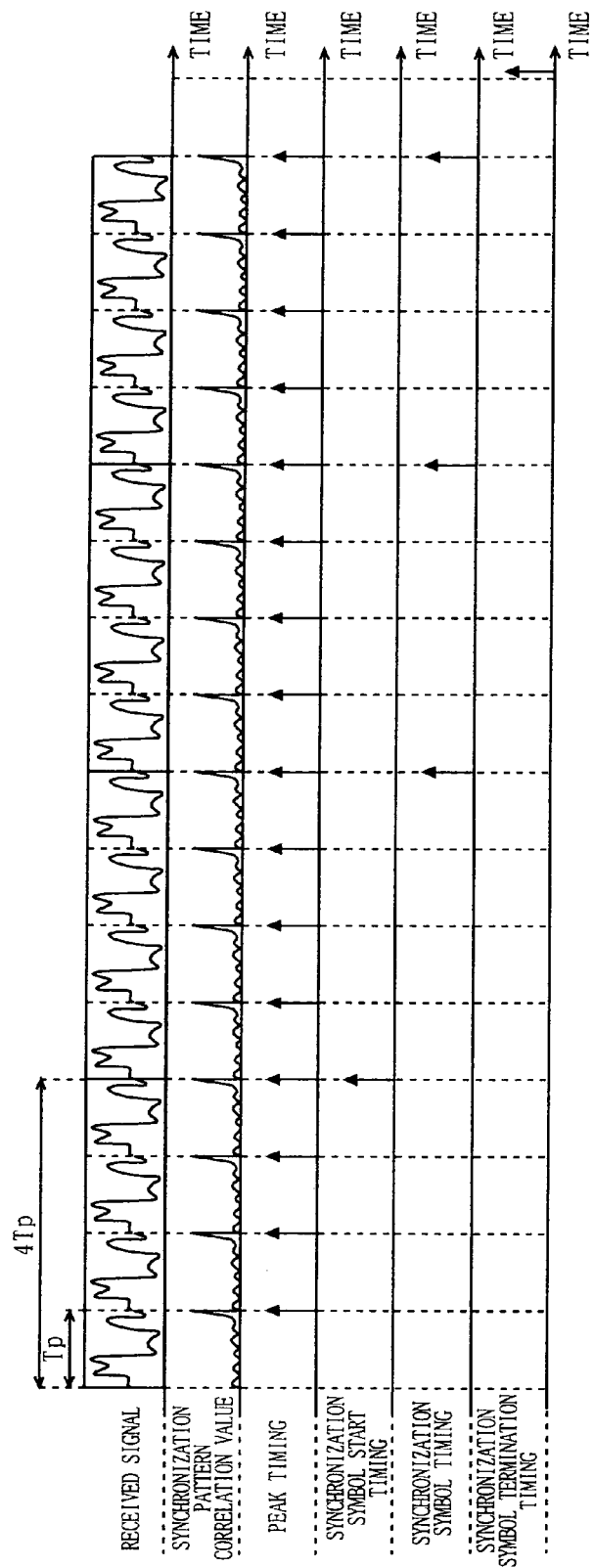
FIG. 6 shows an example of a synchronization pattern correlation value, peak timing, synchronization symbol start timing, synchronization symbol timing, and synchronization symbol termination timing, in the case where one synchronization symbol is formed of four repeated synchronization patterns and one synchronization symbol string is formed of four synchronization symbols.

FIG. 6 shows an example of a synchronization pattern correlation value, peak timing, synchronization symbol start timing, synchronization symbol timing, and synchronization symbol termination timing, in the case where one synchronization symbol is formed of four repeated synchronization patterns and one synchronization symbol string is formed of four synchronization symbols.

When the peak timing is detected at the synchronization pattern interval Tp a predetermined number of times, the timing determination unit 106 determines that a synchronization symbol string has started, and outputs a synchronization symbol start timing. In the example shown in FIG. 6, the timing determination unit 106 determines the time when the peak timing is detected four times at the synchronization pattern interval Tp as the synchronization symbol start timing.

After outputting the synchronization symbol start timing, the timing determination unit 106 outputs a synchronization symbol timing at each synchronization symbol interval. In the example shown in FIG. 6, one synchronization symbol is formed of four repeated synchronization patterns. Therefore, the timing determination unit 106 outputs the synchronization symbol timing at the interval of 4Tp.

After that, when the peak timing stops being detected at the synchronization pattern interval Tp, the timing determination unit 106 determines the synchronization symbol string has terminated, and outputs a synchronization symbol termination timing.

After the synchronization symbol start timing, the received signal, having a rough carrier frequency thereof corrected, is input to the first through V'th sub band correlation units 108-1 through 108-V. The first through V'th sub band correlation units 108-1 through 108-V each calculate a complex correlation between the sub band symbol forming a part of the synchronization symbol and the received signal regarding the respective sub band assigned thereto, and thus obtain a phase difference between transmission and receiving for the respective sub band.

The sub band symbols are orthogonal to each other and have different carrier frequencies. Accordingly, the complex correlation between the sub band symbol assigned to the v'th sub band correlation unit 108-v and the sub band symbol assigned to another sub band correlation unit is 0. Therefore, the correlation value obtained by the v'th sub band correlation unit 108-v is the phase difference between transmission and receiving for the v'th sub band.

When a synchronization symbol timing is output from the timing determination unit 106, the v'th sub band correlation unit 108-v performs correlation calculation of the sub band symbol. The v'th sub band correlation unit 108-v outputs the result of the correlation calculation as the v'th sub band correlation. The period between two continuous synchronization symbol timings, i.e., a synchronization symbol interval, is longer than the synchronization pattern interval Tp. By performing correlation calculation at the synchronization symbol interval which is longer than the synchronization pattern interval Tp, a precise phase difference can be detected. The reason is that in the case of correlation calculation, as the number of samples to be compared (integrated) is greater, the effect of averaging noise is greater and therefore the precision of the correlation value is improved.

The v'th sub band correlation unit 108-v is realized by a circuit for calculating cross correlation such as a matched filter or the like. In the case where each sub band symbol is a complex sine wave having a single frequency, the v'th sub band correlation unit 108-v may calculate cross correlation by single frequency DFT. Alternatively, the v'th sub band correlation unit 108-v may calculate the v'th sub band correlation by DFT, DCT, DWT, filter bank or the like. By any type of calculation, a logical product of the received signal and the complex conjugate of a known sub band signal is integrated for a predetermined time period. In the case where DFT, DCT or DWT is used, the v'th sub band correlation unit 108-v only needs to perform a calculation for retrieving a necessary sub band.

For example, the correlation $C_k$ shown in expression 8 is output from the v'th sub band correlation unit 108-$v$.

The inter-symbol phase difference detection unit 110 obtains a phase difference in the sub band correlation between synchronization symbols at each sub band symbol (inter-symbol phase difference). The phase difference in the sub band correlation between the synchronization symbols will be referred to as a "phase change amount". The inter-symbol phase difference detection unit 110 averages the detected phase change amounts and thus detects a residual frequency error. In this example, the inter-symbol phase difference detection unit 110 obtains an inter-symbol phase difference by obtaining a phase difference in the sub band correlation between the synchronization symbols. The interval at which the phase difference of the sub band correlation is obtained does not need to be the synchronization symbol interval. The inter-symbol phase difference detection unit 110 may obtain an inter-symbol phase difference by obtaining a phase difference in the sub band correlation at a predetermined symbol interval.

For example, in the case where the correlation $C_k$ shown in expression 8 is obtained as the sub band correlation, the k'th inter-symbol phase difference $\theta_k$ can be obtained by expression 9. In expression 9, the symbol interval between the synchronization symbols is T, and the time at which α in expression 8 is maximum is mT.

Expression 9

$$c_{k,m+1} c_{k,m}^* = \alpha^2 e^{j(W_k(m+1)\Delta tT + 2\pi\Delta f(m+1)(T+\Delta tT) + \varphi)} e^{-j(W_k m\Delta tT + 2\pi\Delta f m(T+\Delta tT) + \varphi)}$$
$$= \alpha^2 e^{j(W_k \Delta tT + 2\pi\Delta f(T+\Delta tT))}$$
$$\theta_k = \angle c_{k,n+1} c_{k,n}^* = W_k \Delta tT + 2\pi\Delta f(T + \Delta tT)$$

By averaging the inter-symbol phase differences $\theta_k$ of all the sub bands from expression 9, the carrier frequency error $\Delta f$ can be estimated and thus the residual frequency error can be obtained.

Figure 7:
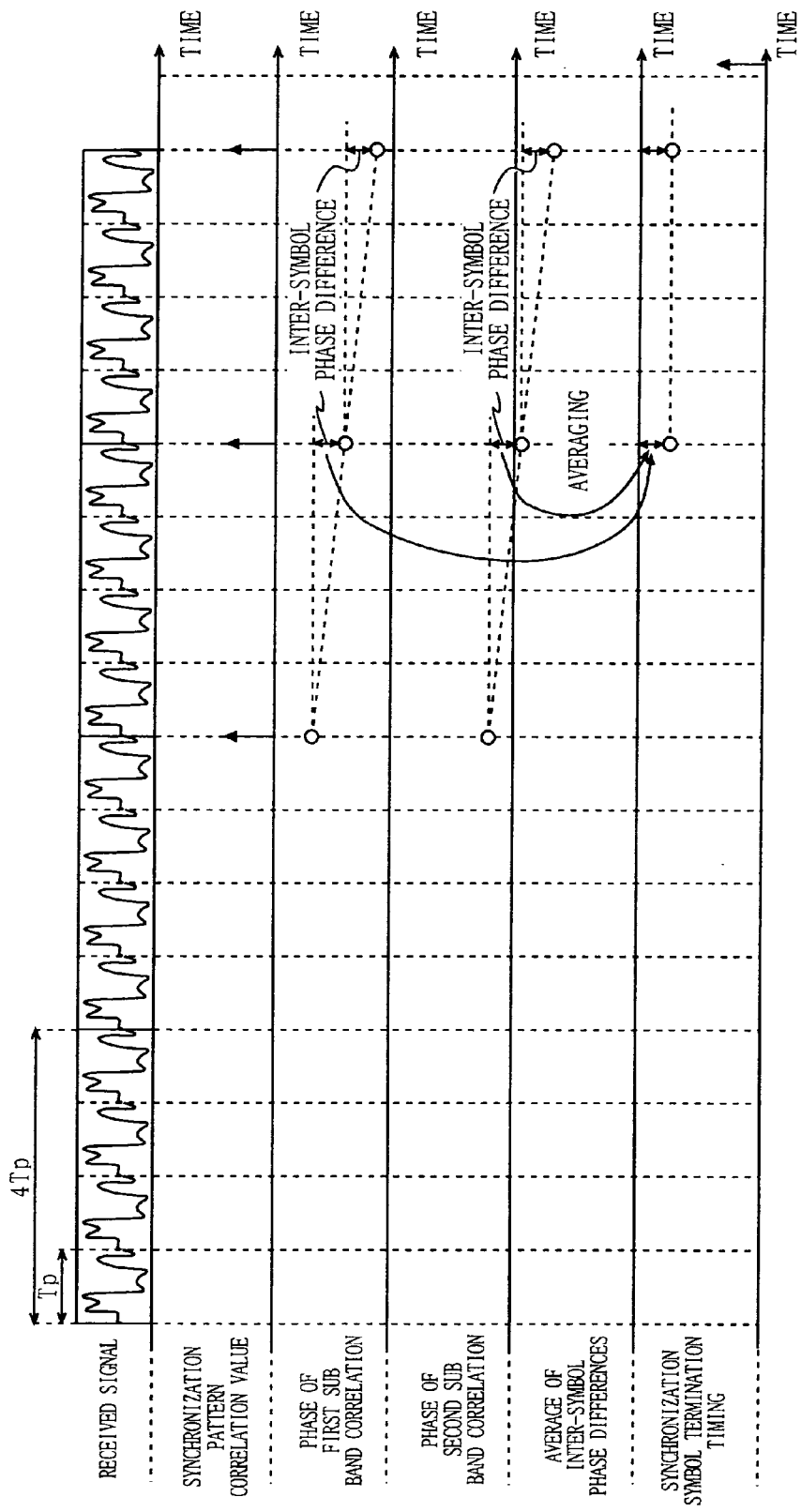
FIG. 7 shows phases of sub band correlation and averages of the inter-symbol phase differences in the case where there are two sub band correlation units.

FIG. 7 shows phases of sub band correlations and averages of the inter-symbol phase differences in the case where there are two sub band correlation units.

The first and second sub band correlation units 108-1 and 108-2 respectively output first and second sub band correlations at each synchronization symbol timing. In this example, it is assumed that the frequency correction unit 103 corrects the frequency based on the rough frequency error estimated by the inter-synchronization pattern phase difference detection unit 107, but there is still a residual frequency error.

In the case where there is a residual frequency error, a certain phase rotation in accordance with the residual frequency error occurs in all the sub bands. This is understood from the fact that in the correlation $C_k$ of expression 8, $\Delta f$ exists in a term which is not related to the sub band $W_k$. The inter-symbol phase difference detection unit 110 obtains a phase change amount (inter-symbol phase difference) of each sub band at the synchronization symbol interval, and averages the phase change amounts (inter-symbol phase differences) of all the sub bands. The inter-symbol phase difference detection unit 110 obtains a residual frequency error based on the averaged phase change amount (averaged inter-symbol phase difference). For example, $\Delta f$ can be obtained by substituting the averaged inter-symbol phase difference into $\theta_k$ of expression 9, assuming $\Delta t=0$.

In the example shown in FIG. 7, the synchronization symbol interval is 4Tp. Therefore, the inter-symbol phase difference detection unit 110 can detect a carrier frequency error equal to or less than ¼Tp.

When a synchronization symbol termination timing is output from the timing determination unit 106, the inter-symbol phase difference detection unit 110 holds the residual frequency error averaged so far, and inputs the residual frequency error to the frequency correction unit 103. The frequency correction unit 103 corrects the received signal received after the synchronization symbol termination timing so as to correct the newly held residual frequency error in addition to the carrier frequency error held before.

The inter-symbol phase difference detection unit 110 inputs the phase change amount (inter-symbol phase difference) of each sub band at the synchronization symbol timing to the inter-sub band phase difference detection unit 111.

The inter-sub band phase difference detection unit 111 compares the phase change amounts of arbitrary sub bands which are obtained at the synchronization symbol interval (inter-symbol phase difference) by the inter-symbol phase difference detection unit 110. The inter-sub band phase difference detection unit 111 detects a clock frequency error based on the comparison result.

For example, the case where the inter-symbol phase difference is represented as $\theta_k$ as in expression 9 will be described. A time-axis difference in $\theta_k$, i.e., the inter-sub band phase difference $\theta k+q-\theta k$ between the inter-symbol phase differences is represented as expression 10.

$$\theta_{k+q} - \theta_k = [W_{k+q}\Delta tT + 2\pi\Delta f(T+\Delta tT)] - [W_k\Delta tT + 2\pi\Delta f(T+\Delta tT)] = (W_{k+q} - W_k)\Delta tT$$

Expression 10

By obtaining the inter-sub band phase difference of the inter-symbol phase differences from expression 10, the clock frequency error $\Delta t$ can be obtained.

As shown in expression 8, the term including the clock frequency error $\Delta t$ includes the sub band $W_k$. Accordingly, as described with reference to FIG. 4C, when a clock frequency error occurs, the phase differences between transmission and receiving occurs are different among the sub bands. The degree of the phase difference between transmission and receiving in each sub band is in proportion to the sub band frequency.

Figure 8:
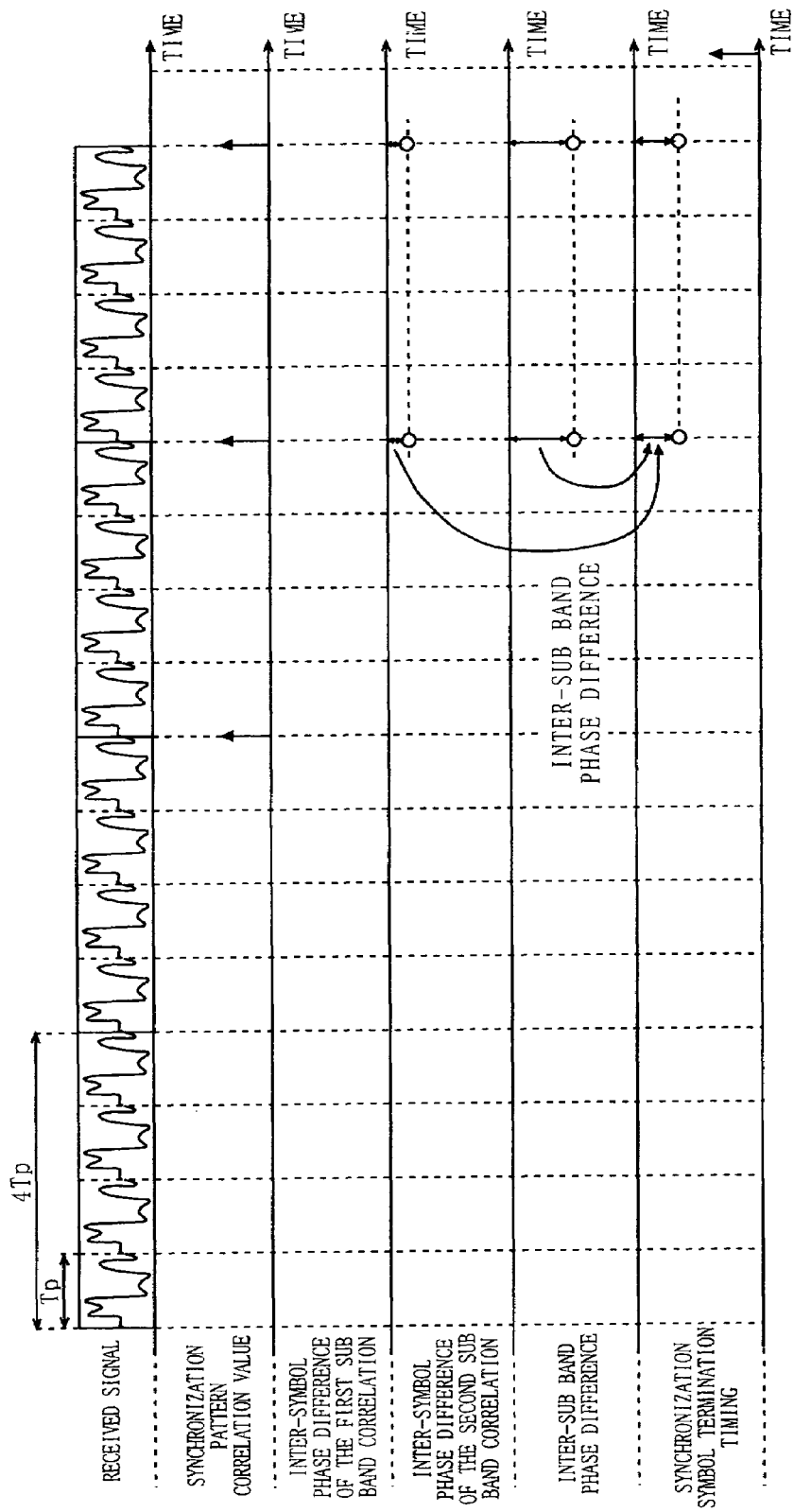
FIG. 8 shows inter-symbol phase differences of the sub band correlations and inter-sub band phase differences in the case where there are two sub band correlation units.

FIG. 8 shows inter-symbol phase differences of the sub band correlations and inter-sub band phase differences in the case where there are two sub band correlation units. The inter-symbol phase difference detection unit 110 inputs a phase change amount of each sub band correlation (inter-symbol phase difference) to the inter-sub band phase difference detection unit 111 at each synchronization symbol timing. In the case where there is a clock frequency error, the phase change amount of the sub band correlation which is input from the inter-symbol phase difference detection unit 110 is different between the sub bands. The inter-sub band phase difference detection unit 111 obtains a difference in the phase change amount of the sub band correlation between every two sub bands (inter-sub band phase difference) and averages the obtained inter-sub band phase differences to obtain a clock frequency error. In the example of expression 10, the inter-sub band phase difference detection unit 111 obtains the inter-sub band phase difference between an arbitrary combination of sub bands. More preferably, inter-sub band phase differences are obtained between a plurality of combinations of sub bands and averaged. By obtaining a plurality of phase changes (corresponding to the gradient of the dashed line in the right graph of FIG. 4C) from the inter-sub band phase differences at arbitrary frequency intervals and averaging the phase changes, the influence of noise can be reduced.

When the synchronization symbol termination timing is detected by the timing detection unit 106, the inter-sub band phase difference detection unit 111 holds the clock frequency error based on the average value of the inter-sub band phase differences, and inputs the clock frequency error to the clock generation unit 102.

The clock generation unit 102 corrects the clock frequency based on the held clock frequency error. The A/D converter 101 samples the received signal received after the synchronization symbol termination timing based on the corrected clock frequency.

The data symbol string received after the synchronization symbol termination timing has the carrier frequency error and the clock frequency error corrected, and therefore the demodulation error in the data demodulation unit 112 can be alleviated.

According to the present invention, the reception device first detects a carrier frequency error based on a phase difference of a synchronization pattern correlation value at a synchronization pattern interval which is shorter than a symbol interval and corrects an error of a receiving frequency. Thus, a rough carrier frequency error is corrected. Next, the reception device detects a residual frequency error based on a phase change of the correlation of a sub band symbol. Since the rough carrier frequency is already corrected, the reception device can detect the residual frequency error with high precision. The reception device corrects an error of the receiving frequency based on the detected residual frequency error. Thus, even when the carrier frequency error is large, the reception device can correct the carrier frequency error with high precision. The reception device obtains an inter-sub band phase difference based on an inter-symbol phase difference of each sub band, and detects a sampling clock frequency error based on the inter-sub band phase difference and corrects the sampling clock frequency error. Thus, the demodulation error in the data symbol can be reduced. The reception device can detect a timing, a carrier frequency error, and a clock frequency error using one, same synchronization symbol. Therefore, the reception device can establish synchronization with the transmission side in a short period of time.

The residual frequency error and the clock frequency error can be obtained as long as there are at least two sub band correlation units.

The sub bands assigned to the sub band correlation units do not need to be adjacent to each other. Even when the sub bands which are not adjacent to each other are used, the inter-sub band phase difference detection unit 111 can obtain an inter-sub band phase difference in consideration of the bandwidth between the two sub bands and thus detect a clock frequency error. In the example of expression 10, the inter-sub band phase difference detection unit 111 can obtain a clock frequency error $\Delta t$ by dividing the inter-sub band phase difference by the bandwidth between the two sub bands.

In the above, the principle of the present invention has been described by the numerical representation using the orthogonal bases by discrete Fourier transform. The present invention is applicable to other systems than use of the orthogonal bases by discrete Fourier transform. In such a case also, it can be confirmed by a numerical representation that the present invention can be carried out.

In the above embodiment, the inter-symbol phase difference detection unit 110 compares the phases of the sub band correlations at each synchronization symbol timing. The interval for the phase comparison may be variable. When the interval of the phase comparison is shorter, the inter-symbol phase difference detection unit 110 can detect the carrier frequency error in a wider range. By contrast, when the interval of the phase comparison is longer, the inter-symbol phase difference detection unit 110 can detect the carrier frequency error with higher precision although the detection range is narrower. Accordingly, in the case where the frequency error is large, for example, at the start of the operation of the reception device, the inter-symbol phase difference detection unit 110 may compare phases at, for example, each synchronization symbol timing such that the carrier frequency error can be detected in a wider range. When the frequency error becomes smaller as a result of receiving a transmission frame a plurality of times thereafter, the inter-symbol phase difference detection unit 110 can compare phases at, for example, each synchronization symbol timing which arrives at a transmission frame interval such that the carrier frequency error is detected in a narrow range with higher precision. For example, when the phase comparison interval Tc=1[sec], where the phase difference is present up to $\pi$, a frequency error up to 0.5 Hz can be detected. When the phase comparison interval Tc=0.1[sec], where the phase difference is present up to $\pi$, a frequency error up to 5 Hz can be detected. When the phase comparison interval Tc=10[sec], where the phase difference is present up to $\pi$, a frequency error up to 0.05 Hz can be detected. When the phase difference is equal to or less than $\Delta\phi$, the phase difference may not be detected at practical precision. Even when the frequency error is relatively small and the phase difference is equal to or less than $\Delta\phi$ at a certain phase comparison interval Tc, the phase difference can be made larger than $\Delta\phi$ by multiplying Tc by u. Therefore, the inter-symbol phase difference detection unit 110 can detect a phase difference. The inter-symbol phase difference detection unit 110 can estimate the carrier frequency error by dividing the obtained value by u.

The reception device according to the present invention is effective for receiving a data symbol string multicarrier-modulated using an orthogonal wavelet function. With multicarrier modulation using an orthogonal wavelet function, the subcarrier interval can be made narrower than that of OFDM modulation. When the subcarrier interval is narrower, the sidelobe is more steeper. This makes it difficult to correct a wide range of carrier frequency errors and clock frequency errors using a pilot signal. The reason is that when the subcarrier interval is narrower, higher precision frequency correction needs to be done before subcarrier separation calculation (orthogonal transform such as Fourier transform) in order to separate subcarriers from each other without causing inter-subcarrier interference. With the frequency error detection merely using a pilot signal buried in the data symbol, the detection range of frequency errors is about the subcarrier interval divided by a few. This is why the frequency error correction using a synchronization symbol string according to the present invention is effective for receiving a data symbol string multicarrier-modulated using an orthogonal wavelet function.

Each of the functional blocks in this embodiment only needs to be implemented as means for performing a function thereof. The functional blocks may be implemented in one piece of hardware or a plurality of pieces of hardware.

Figure 9:
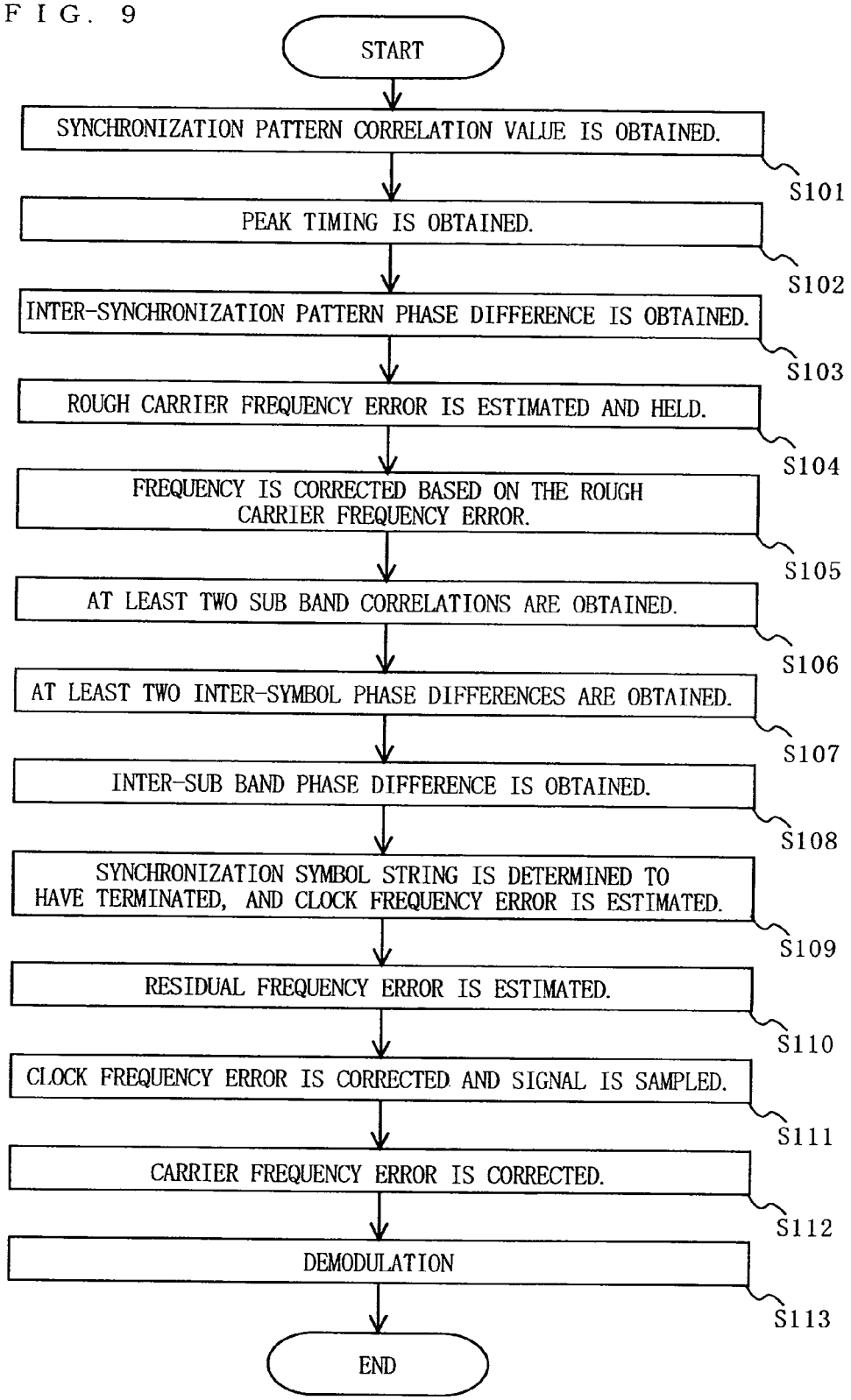
FIG. 9 is a flowchart showing an operation of the reception device when a program in this embodiment is executed.
Figure 10:
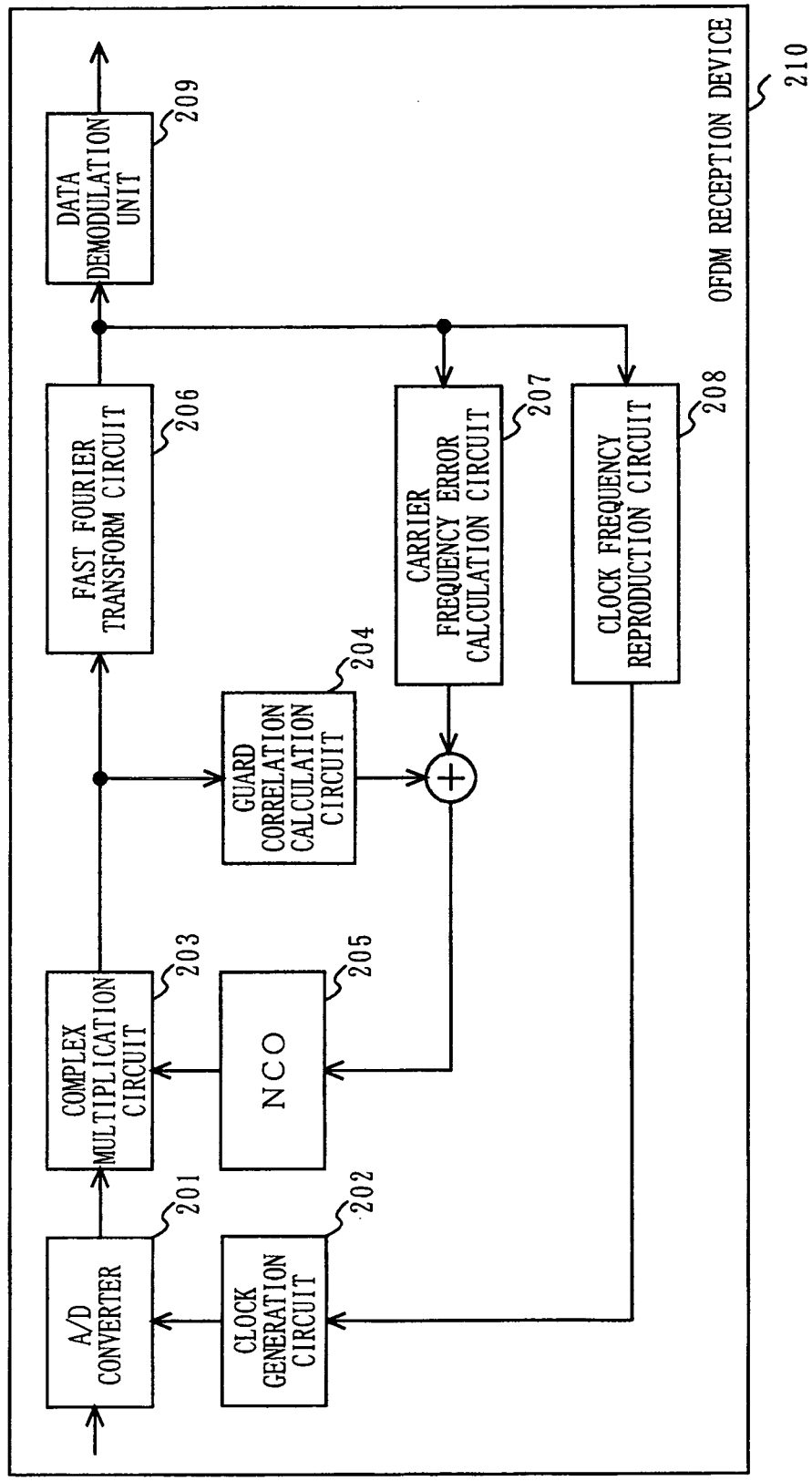
FIG. 10 shows a structure of a conventional OFDM reception device 210 disclosed in patent document 1.

The reception device in this embodiment may be provided as software. Specifically, a program capable of causing a general-purpose computer device to execute an operation shown in FIG. 9 is stored on a storage medium in the reception device. By causing the computer device to execute the program, the reception device in this embodiment can be realized.

FIG. 9 is a flowchart showing an operation of the reception device when the program in this embodiment is executed. Hereinafter, with reference to FIG. 9, an operation of the reception device when the program in this embodiment is executed will be described.

First, the reception device obtains a correlation between a received signal R and a synchronization pattern P, and sets the correlation as a synchronization pattern correlation value (step S101). Next, the reception device obtains a timing when the magnitude of the synchronization pattern correlation value is maximum, and sets the timing as a peak timing (step S102). Then, the reception device obtains, at each peak timing, a difference between the phase of the synchronization pattern correlation value at the immediately previously peak timing and the phase of the synchronization pattern correlation value at the current timing, and sets the difference as an inter-synchronization pattern phase difference (step S103).

The reception device determines whether or not the peak timing T has been detected a predetermined number of times. When the peak timing T has been detected a predetermined number of times, the reception device determines that the synchronization symbol starting timing has arrived. The reception device averages the inter-synchronization pattern phase differences obtained so far, estimates a rough carrier frequency error based on the averaged value, and holds the estimated rough carrier frequency error (step S104). The processing in steps S101 through S104 is performed on a first half of the synchronization symbol string.

Upon holding the rough carrier frequency error, the reception device corrects the frequency of the subsequent received signal based on the rough carrier frequency error (step S105).

Next, the reception device obtains a correlation between the sub band symbol and the received signal with the frequency corrected at each synchronization symbol timing, and sets the correlation as a sub band correlation (step S106). The sub band correlation is obtained regarding at least two sub band symbols.

Then, the reception device obtains a difference between the phase of the sub band correlation at the immediately previous timing and the phase of the sub band correlation at the current timing at a predetermined symbol interval (for example, at a synchronization symbol interval), and sets the difference as an inter-symbol phase difference (step S107). The inter-symbol phase difference is obtained regarding least two sub band symbols.

The reception device obtains a difference between the inter-symbol phase differences, obtained in step S107, of sub bands, and sets the inter-sub band difference as an inter-sub band phase difference (step S108).

When the peak of the synchronization pattern correlation value does not arrive anymore, the reception device determines that the synchronization symbol string has terminated, averages the inter-sub band phase differences obtained so far, and estimates a clock frequency error (step S109).

Next, the reception device averages the inter-symbol phase differences obtained so far to obtain a residual frequency error (step S110). The processing in steps S105 through S110 is executed while a second half of the synchronization symbol string is received.

The reception device samples the signal which is input thereafter using a clock corrected based on the clock frequency error obtained in step S109 (step S111).

The reception device corrects the frequency of the sampled signal based on the residual frequency error obtained in step S110 (step S112).

The reception device demodulates the signal frequency-corrected in step S112 (step S113) and terminates the processing. The processing in steps S111 through S113 is executed while a data symbol string is received.

As described above, the reception device in this embodiment may be realized as software.

The functional blocks shown in FIG. 1 may be realized as an LSI, which is an integrated circuit. These functional blocks may be incorporated into one chip. A part of, or the entirety of, these functional blocks may be incorporated into one chip. The "LSI" may be referred to as an "IC", "system LSI", "super LSI", or "ultra LSI" depending on the degree of integration. The method for integration is not limited to incorporation into an LSI, and the functional blocks may be incorporated into a dedicated circuit or a general-purpose processor. Alternatively, an FPGA (Field Programmable Gate Array) which is programmable after LSI production, or a reconfigurable processor in which the connection or setting of circuit cells in the LSI is reconfigurable, may be used. When the development of the semiconductor technology and generation of other technologies derived therefrom produce integration techniques replacing the LSI, the functional blocks may be integrated using such techniques. Application of biotechnology is possible as an example.

While the invention has been described in detail, the foregoing description is in all aspects illustrative and not restrictive. It is understood that numerous other modifications and variations can be devised without departing from the scope of the invention.

INDUSTRIAL APPLICABILITY

A reception device according to the present invention can perform symbol synchronization, carrier frequency synchronization, and clock frequency synchronization using a multi-carrier synchronization preamble in a short period of time even when a carrier frequency error is large, and is useful for wired or wireless transmission devices or the like.

The invention claimed is:

1. A reception device for receiving a transmission frame including a synchronization symbol string, having a synchronization symbol repeated a plurality of times, inserted before a data symbol string, wherein:

the synchronization symbol is a symbol obtained by synthesizing a plurality of sub band symbols which are orthogonal to each other and having different carrier frequencies;

the carrier frequencies of the plurality of sub band symbols are located at an equal predetermined frequency interval;

the synchronization symbol includes a synchronization pattern repeated at an interval of a reciprocal of the predetermined frequency interval;

the reception device comprises:
a clock generation unit for generating a sampling clock;
an analog/digital converter for sampling the transmission frame based on the sampling clock generated by the clock generation unit and analog/digital-converting the transmission frame;
a frequency correction unit for correcting a frequency of an output from the analog/digital converter;
a synchronization pattern correlation unit for obtaining a correlation between the output from the frequency correction unit and the synchronization pattern, and outputting the correlation as a synchronization pattern correlation value;

a peak detection unit for detecting a peak of the output from the synchronization pattern correlation unit, and outputting the peak as a peak timing;

a timing determination unit for outputting a predetermined timing in the synchronization symbol based on the peak timing which is output from the peak detection unit;

an inter-synchronization pattern phase difference detection unit for detecting a change amount of a phase of the synchronization pattern correlation value which is output from the synchronization pattern correlation unit in accordance with the output from the timing determination unit and the peak timing which is output from the peak detection unit, and estimating an error of the frequency of the output from the analog/digital converter based on the change amount of the phase of the synchronization pattern correlation value;

a plurality of sub band correlation units each for obtaining a correlation between a sub band symbol assigned thereto, among the plurality of sub band symbols, and the output from the frequency correction unit, and outputting the correlation as a sub band correlation;

an inter-symbol phase difference detection unit for obtaining a phase difference at a predetermined symbol interval of the sub band correlation which is output from each of the plurality of sub band correlation units in accordance with the output from the timing determination unit, outputting the phase difference as an inter-symbol phase difference, and estimating an error of the frequency of the output from the analog/digital converter based on the inter-symbol phase difference;

an inter-sub band phase difference detection unit for detecting a phase difference, among the sub bands, of the inter-symbol phase difference which is output from the inter-symbol phase difference detection unit as an inter-sub band phase difference in accordance with the output from the timing determination unit, and estimating an error of the sampling clock based on the detected inter-sub band phase difference; and a data demodulation unit for demodulating the output from the frequency correction unit in accordance with the output from the timing determination unit;

the frequency correction unit corrects the frequency of the output from the analog/digital converter based on the frequency error estimated by the inter-synchronization pattern phase difference detection unit, and then corrects the frequency of the output from the analog/digital converter based on the frequency error estimated by the inter-symbol phase difference detection unit; and the clock generation unit corrects a frequency of the sampling clock based on the error estimated by the inter-sub band phase difference detection unit.

2. A reception device according to claim 1, wherein the timing determination unit outputs a start timing of the synchronization symbol string when the peak timing which is output from the peak detection unit is detected at the synchronization pattern interval a predetermined number of times, and outputs a termination timing of the synchronization symbol string when the peak timing stops being detected at the synchronization pattern interval.

3. A reception device according to claim 2, wherein the inter-synchronization pattern phase difference detection unit averages the change amounts of the phase of the synchronization pattern correlation value, estimates the frequency error of the output from the analog/digital converter, and when the start timing is output from the timing determination unit, terminates the averaging and inputs the estimated frequency error to the frequency correction unit.

4. A reception device according to claim 2, wherein when the start timing is output from the timing detection unit, the inter-symbol phase difference detection unit averages the inter-symbol phase differences and estimates the frequency error of the output from the analog/digital converter.

5. A reception device according to claim 1, wherein the inter-symbol phase difference detection unit shortens the predetermined symbol interval when the frequency error is large and extends the predetermined symbol interval when the frequency error is small.

6. A reception device according to claim 1, wherein the inter-sub band phase difference detection unit averages the inter-sub band phase differences and estimates the error of the sampling clock.

7. A reception device according to claim 1, wherein the data symbol string is multicarrier-modulated using an orthogonal wavelet function.

8. An integrated circuit for receiving a transmission frame including a synchronization symbol string, having a synchronization symbol repeated a plurality of times, inserted before a data symbol string, wherein:

the synchronization symbol is a symbol obtained by synthesizing a plurality of sub band symbols which are orthogonal to each other and having different carrier frequencies;

the carrier frequencies of the plurality of sub band symbols are located at an equal predetermined frequency interval;

the synchronization symbol includes a synchronization pattern repeated at an interval of a reciprocal of the predetermined frequency interval;

the reception device comprises:

a clock generation unit for generating a sampling clock;

an analog/digital converter for sampling the transmission frame based on the sampling clock generated by the clock generation unit and analog/digital-converting the transmission frame;

a frequency correction unit for correcting a frequency of an output from the analog/digital converter;

a synchronization pattern correlation unit for obtaining a correlation between the output from the frequency correction unit and the synchronization pattern, and outputting the correlation as a synchronization pattern correlation value;

a peak detection unit for detecting a peak of the output from the synchronization pattern correlation unit, and outputting the peak as a peak timing;

a timing determination unit for outputting a predetermined timing in the synchronization symbol based on the peak timing which is output from the peak detection unit;

an inter-synchronization pattern phase difference detection unit for detecting a change amount of a phase of the synchronization pattern correlation value which is output from the synchronization pattern correlation unit in accordance with the output from the timing determination unit and the peak timing which is output from the peak detection unit, and estimating an error of the frequency of the output from the analog/ digital converter based on the change amount of the phase of the synchronization pattern correlation value;

a plurality of sub band correlation units each for obtaining a correlation between a sub band symbol assigned thereto, among the plurality of sub band symbols, and the output from the frequency correction unit, and outputting the correlation as a sub band correlation;

an inter-symbol phase difference detection unit for obtaining a phase difference at a predetermined symbol interval of the sub band correlation which is output from each of the plurality of sub band correlation units in accordance with the output from the timing determination unit, outputting the phase difference as an inter-symbol phase difference, and estimating an error of the frequency of the output from the analog/digital converter based on the inter-symbol phase difference;

an inter-sub band phase difference detection unit for detecting a phase difference, among the sub bands, of the inter-symbol phase difference which is output from the inter-symbol phase difference detection unit as an inter-sub band phase difference in accordance with the output from the timing determination unit, and estimating an error of the sampling clock based on the detected inter-sub band phase difference; and a data demodulation unit for demodulating the output from the frequency correction unit in accordance with the output from the timing determination unit;

the frequency correction unit corrects the frequency of the output from the analog/digital converter based on the frequency error estimated by the inter-synchronization pattern phase difference detection unit, and then corrects the frequency of the output from the analog/digital converter based on the frequency error estimated by the inter-symbol phase difference detection unit; and the clock generation unit corrects a frequency of the sampling clock based on the error estimated by the inter-sub band phase difference detection unit.

9. A method for receiving a transmission frame including a synchronization symbol string, having a synchronization symbol repeated a plurality of times, inserted before a data symbol string, wherein:

the synchronization symbol is a symbol obtained by synthesizing a plurality of sub band symbols which are orthogonal to each other and having different carrier frequencies;

the carrier frequencies of the plurality of sub band symbols are located at an equal predetermined frequency interval;

the synchronization symbol includes a synchronization pattern repeated at an interval of a reciprocal of the predetermined frequency interval; and the method comprises:

sampling and analog/digital-converting a transmission frame;

obtaining a correlation between the analog/digital-converted signal and the synchronization pattern, and setting the correlation as a synchronization pattern correlation value;

detecting a peak of the synchronization pattern correlation value, and setting the peak as a peak timing;

detecting a predetermined timing in the synchronization symbol based on the peak timing;

detecting a change amount of a phase of the synchronization pattern correlation value in accordance with the predetermined timing and the peak timing, and estimating an error of a frequency of the output from an analog/digital converter based on the change amount of the phase of the synchronization pattern correlation value;

obtaining a correlation between each of at least two sub band symbols, among the plurality of sub band symbols, and the signal with the frequency corrected, and setting the correlations as at least two sub band correlations;

obtaining a phase difference at a predetermined symbol interval of each of the sub band correlations in accordance with the predetermined timing, and setting the phase difference as an inter-symbol phase difference;

estimating an error of the frequency of the output from the analog/digital converter based on the inter-symbol phase difference;

setting a phase difference, among the sub bands, of the inter-symbol phase difference in accordance with the predetermined timing as an inter-sub band phase difference;

estimating an error of the sampling clock based on the inter-sub band phase difference;

correcting the frequency of the analog/digital-converted signal based on the error of the frequency estimated based on the change amount of the phase of the synchronization pattern correlation value;

correcting the frequency of the analog/digital-converted signal based on the error of the frequency estimated based on the inter-symbol pattern phase difference;

correcting the frequency of the sampling clock based on the error of the sampling clock estimated based on the inter-sub band phase difference; and demodulating the corrected analog/digital-converted signal.

* * * * *